Nov. 26, 1940.   J. C. McCUNE   2,223,114
INERTIA TYPE BRAKE CONTROL MEANS
Filed Feb. 10, 1939   11 Sheets-Sheet 1

INVENTOR
JOSEPH C. McCUNE
BY
ATTORNEY

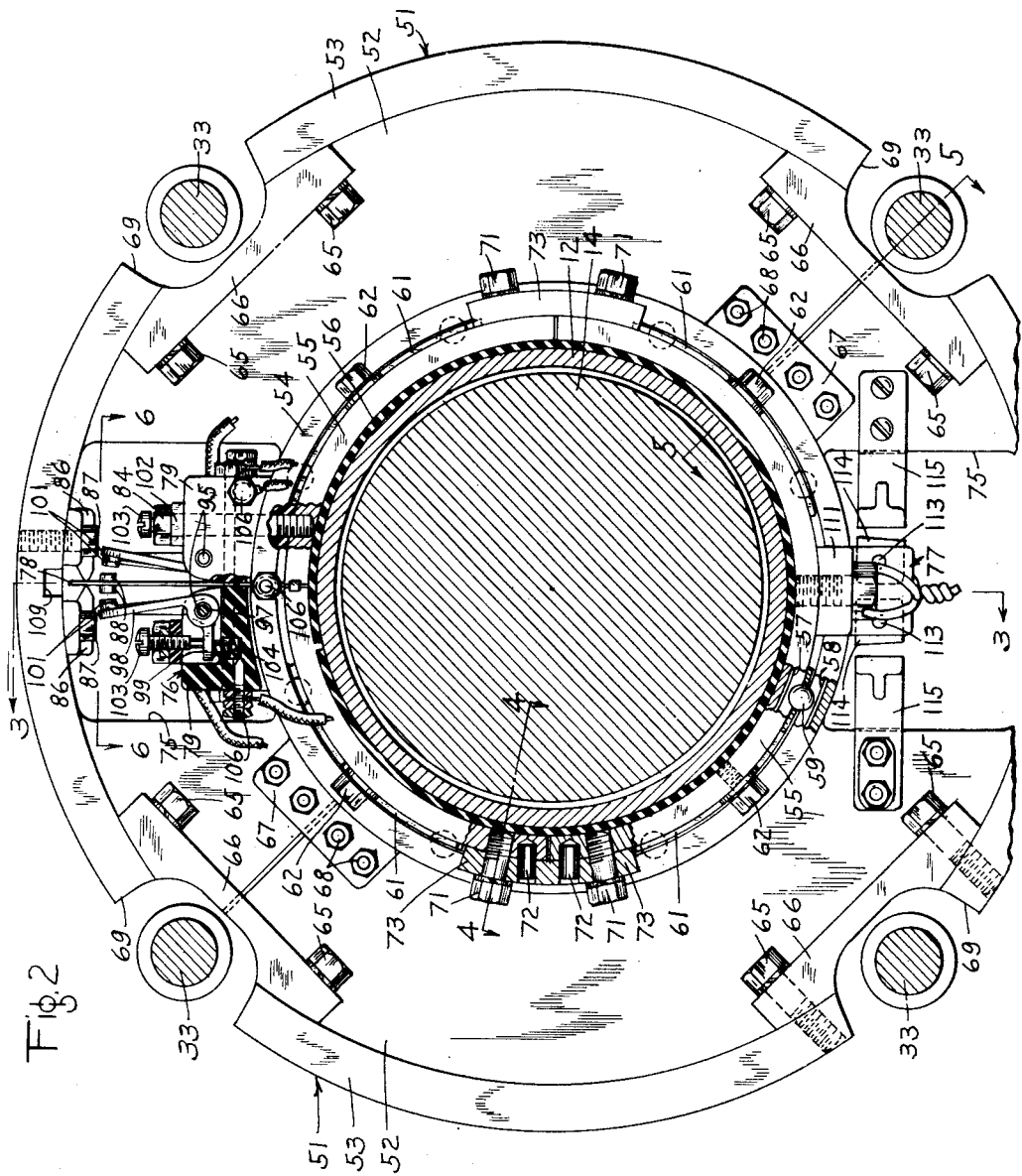

Nov. 26, 1940.    J. C. McCUNE    2,223,114
INERTIA TYPE BRAKE CONTROL MEANS
Filed Feb. 10, 1939    11 Sheets-Sheet 3
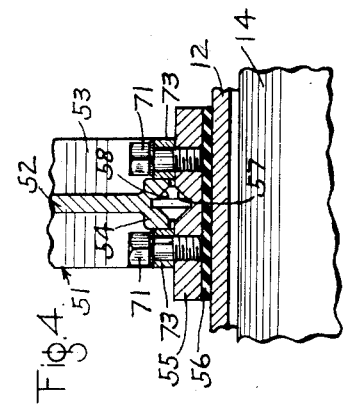
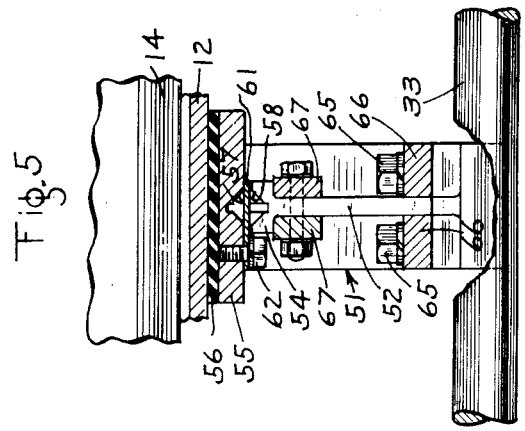
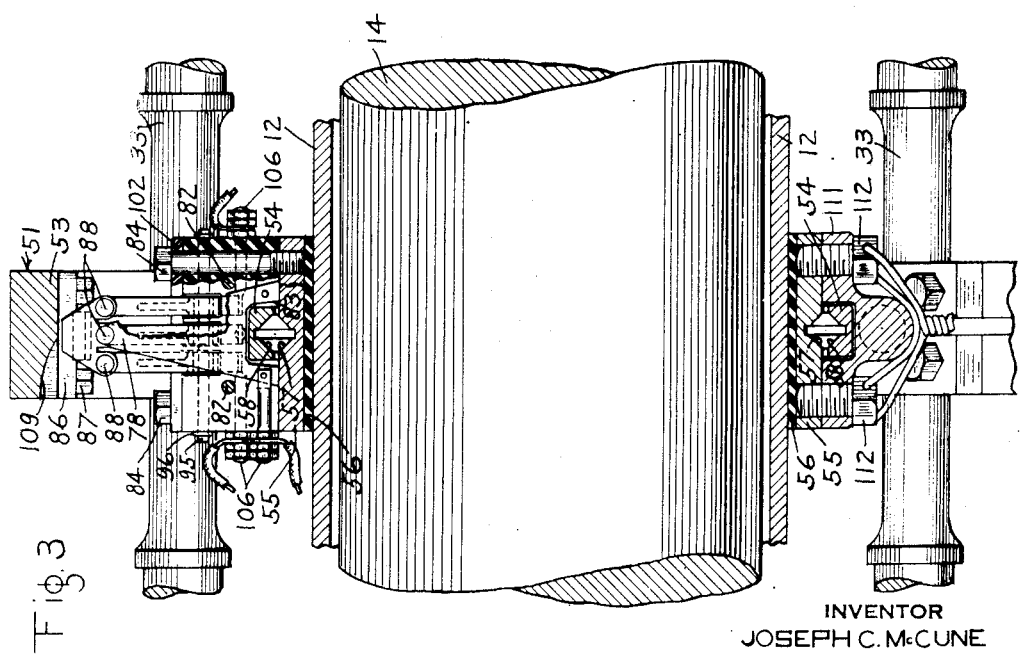
INVENTOR
JOSEPH C. McCUNE
BY
ATTORNEY

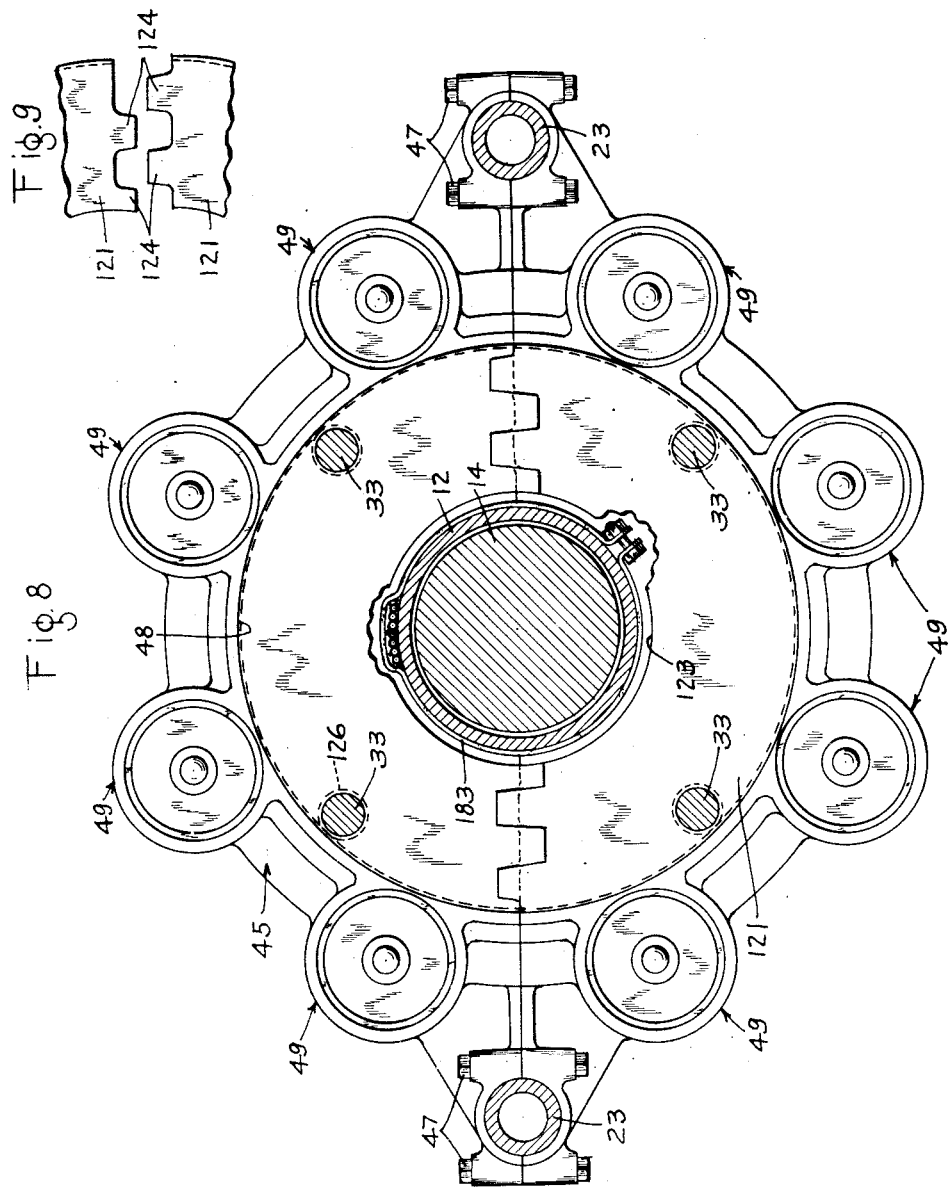

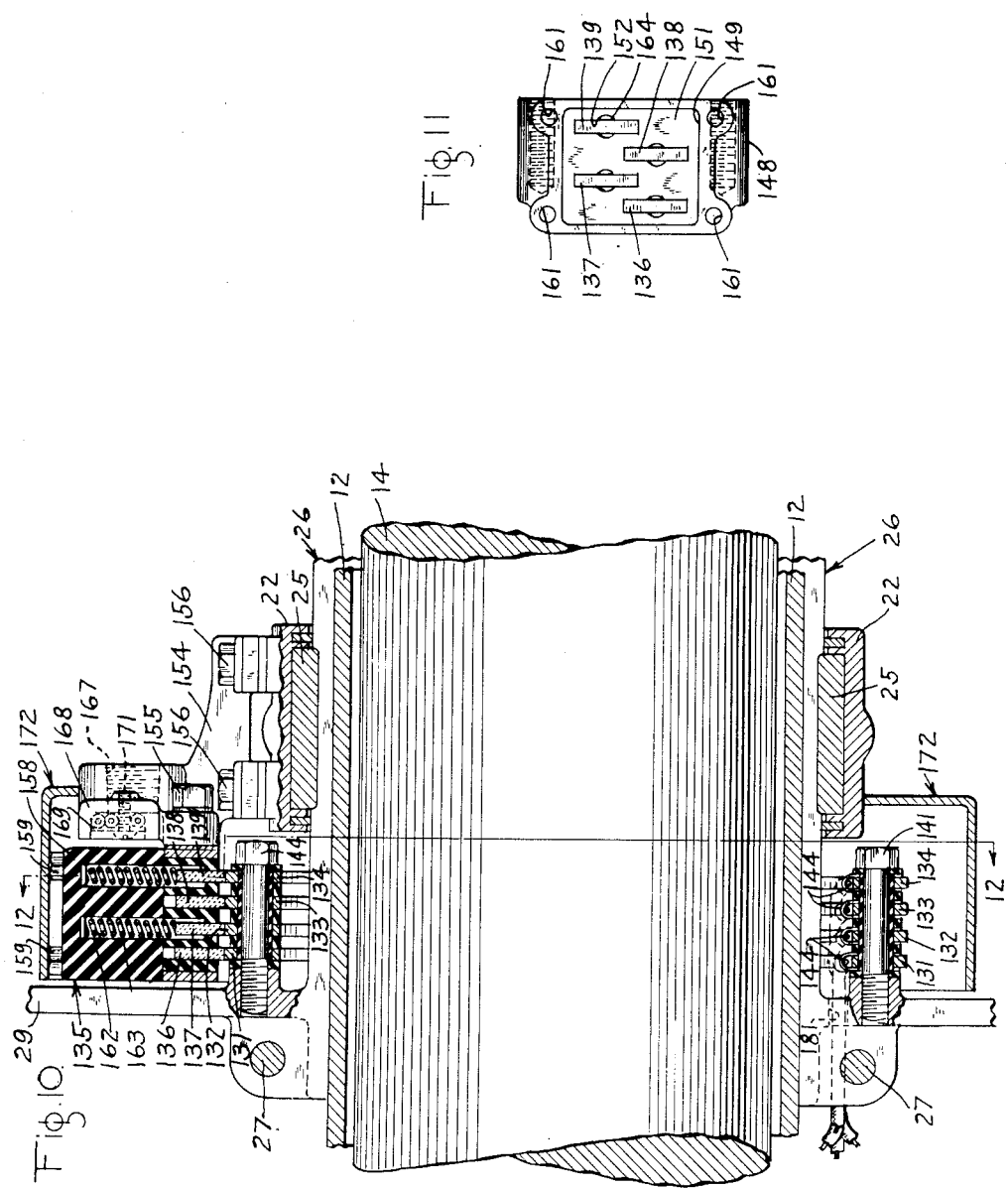

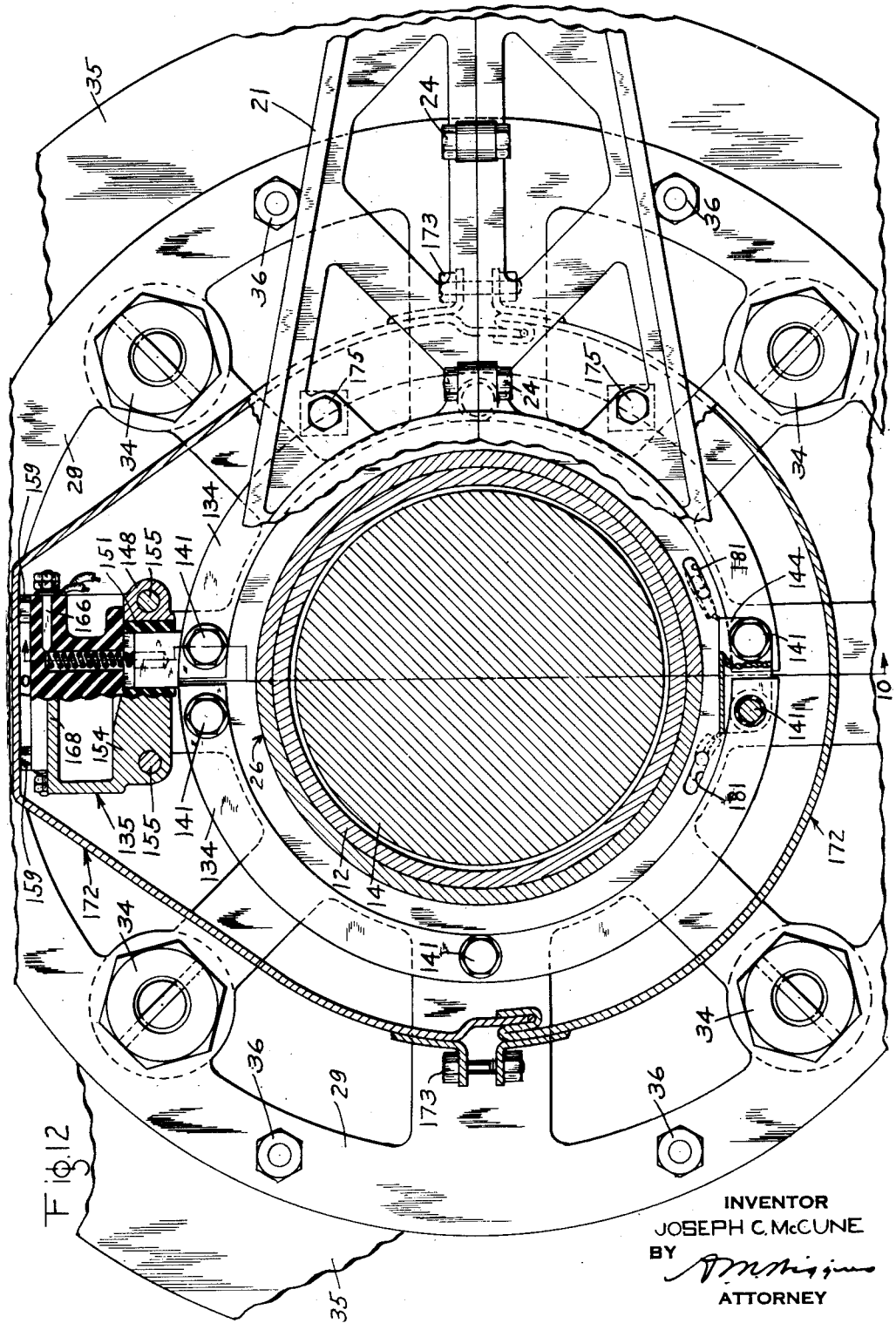

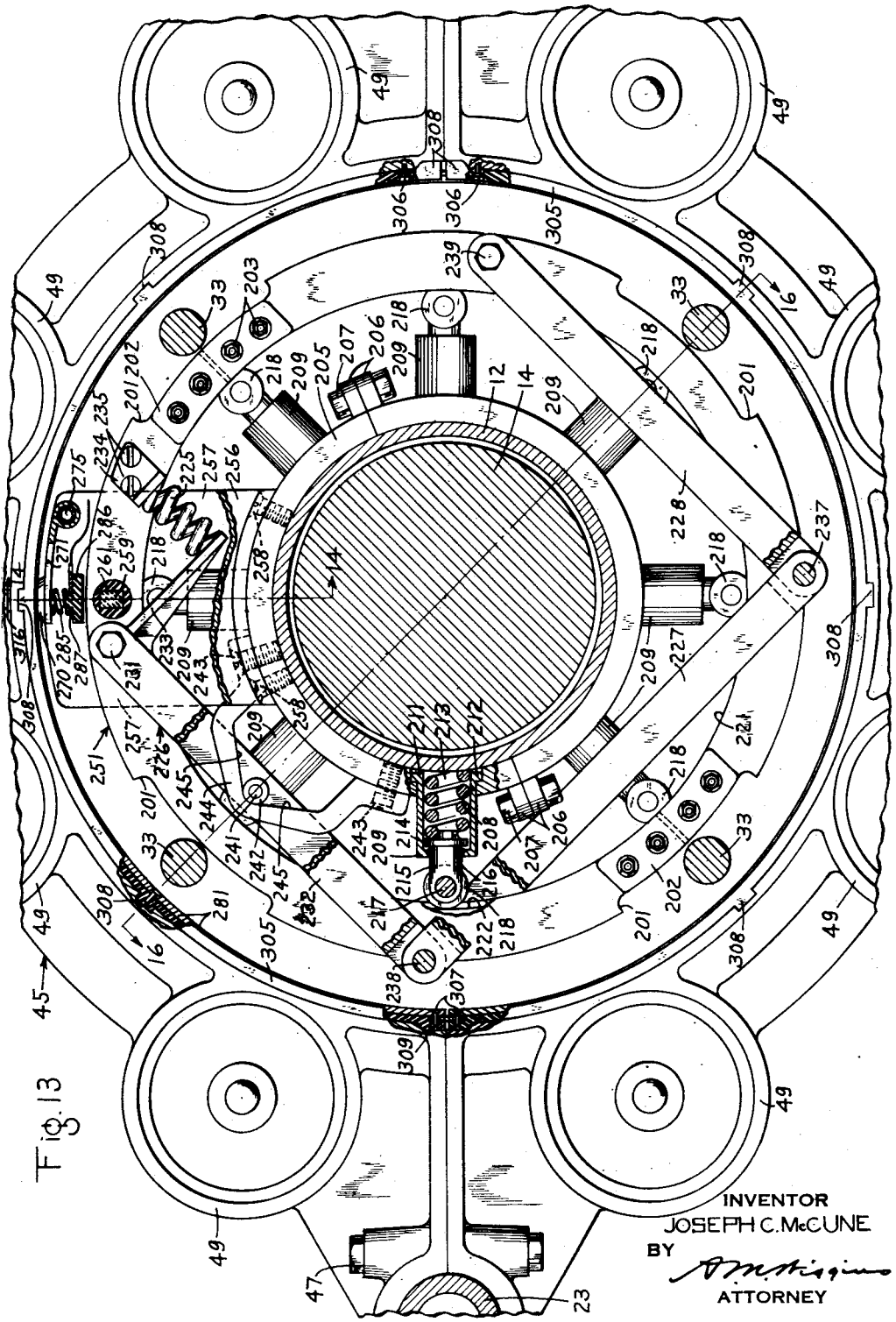

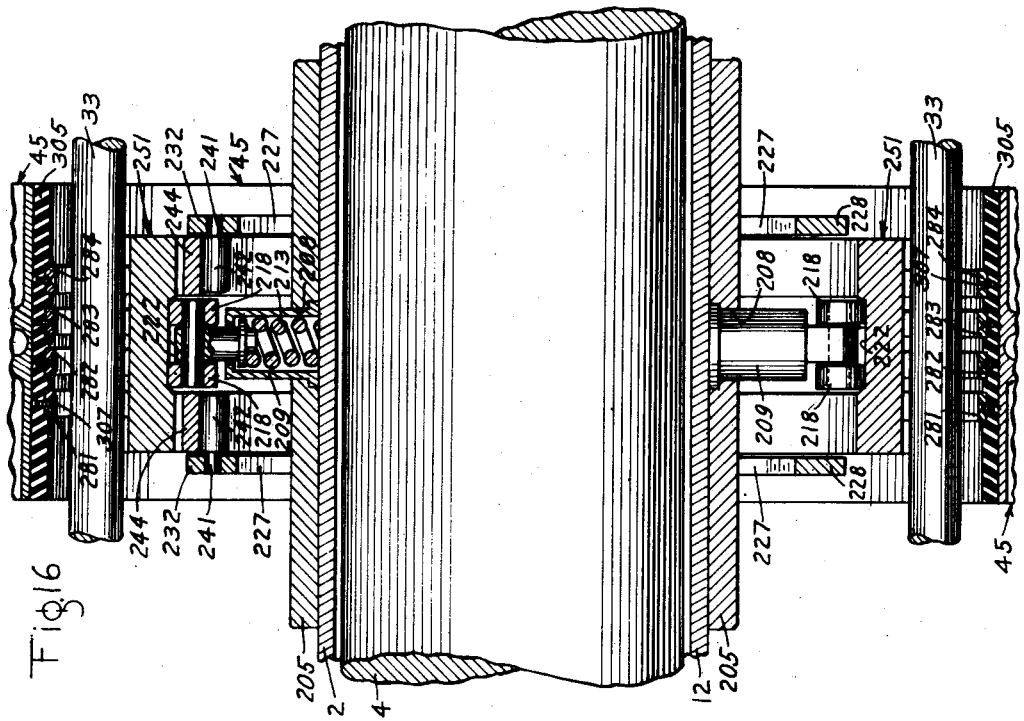
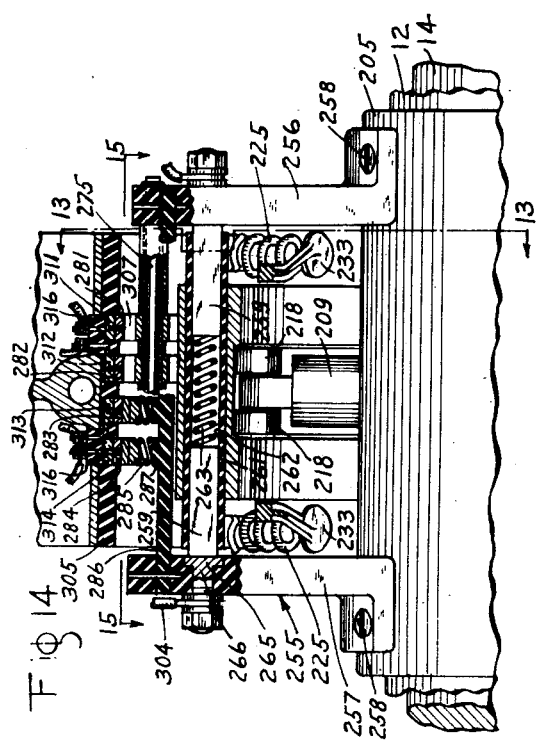
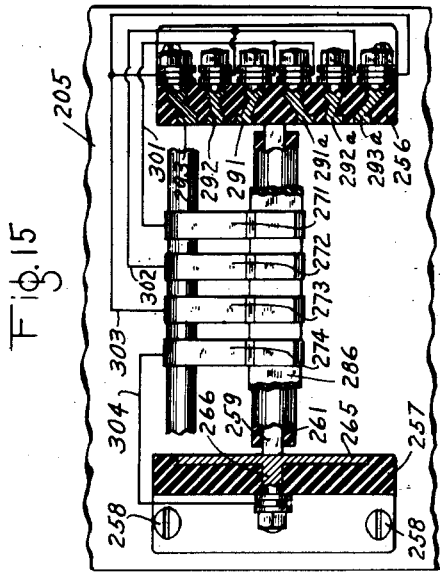

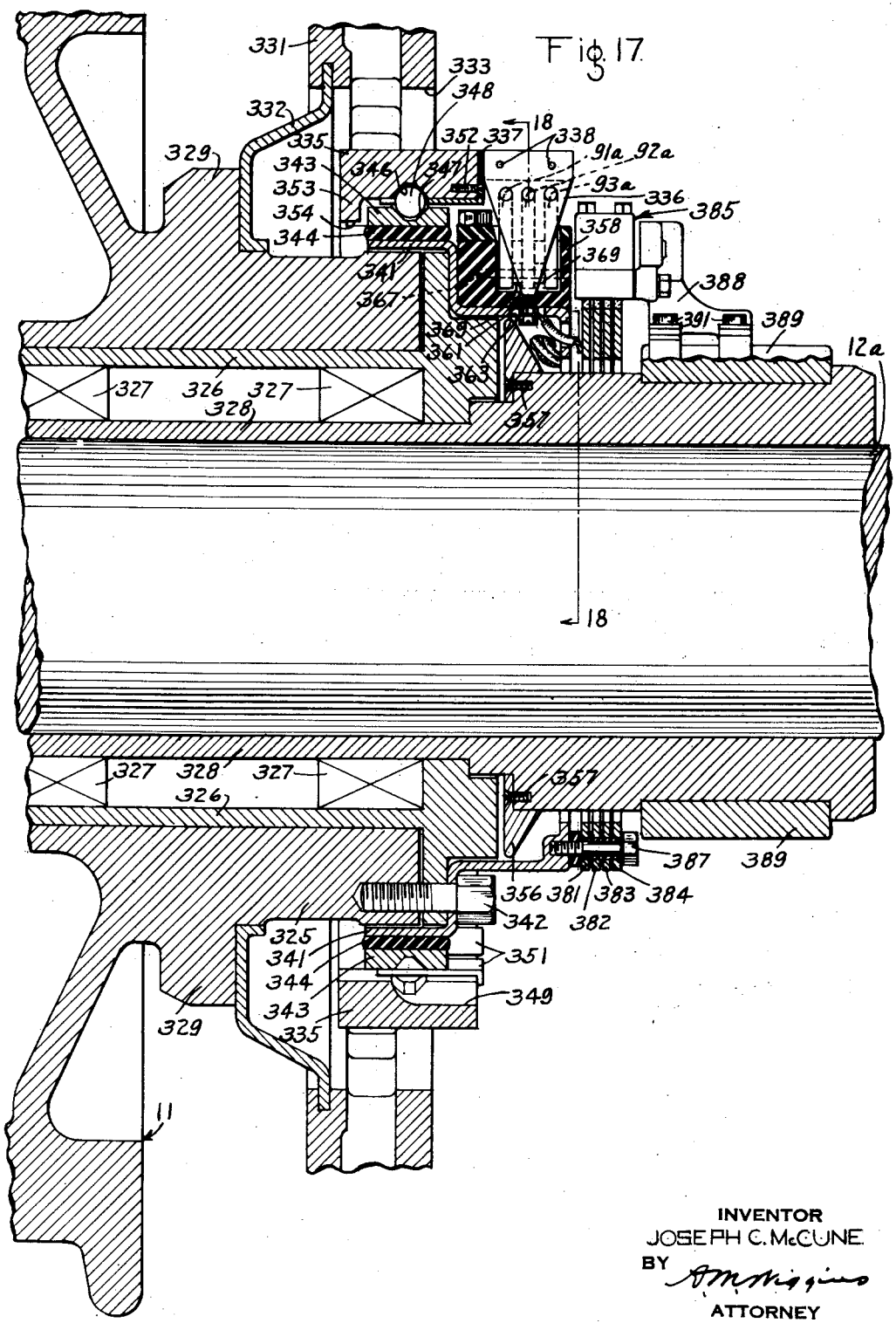

Patented Nov. 26, 1940

2,223,114

UNITED STATES PATENT OFFICE 2,223,114

INERTIA TYPE BRAKE CONTROL MEANS

Joseph C. McCune, Edgewood, Pa., assignor to The Westinghouse Air Brake Company, Wilmerding, Pa., a corporation of Pennsylvania Application February 10, 1939, Serial No. 255,649

18 Claims. (Cl. 200—52)

This invention relates to inertia type brake control means and has particular relation to rotary inertia devices responsive to the rate of rotative acceleration or deceleration of an individual vehicle wheel or wheel axle for controlling the vehicle brakes.

With the advent of modern railway trains intended to travel normally at speeds in excess of one hundred miles per hour, it has become increasingly necessary to provide braking equipment wherein the rubbing parts of the brake devices may absorb the kinetic energy of the train without undue heating and wear or failure. One of the more recently proposed types of brakes for trains traveling normally at high speeds in excess of one hundred miles per hour is of the disc type. One such type of disc brake is disclosed and claimed in my copending application Serial No. 225,785, filed August 19, 1938, and comprises briefly a plurality of alternately disposed rotative and non-rotative discs or rings, the non-rotative discs being mounted in the vehicle wheel truck in a manner so as not to rotate and the rotative discs being arranged to rotate with the vehicle wheel of an individual wheel and axle assembly. The non-rotative and rotative discs are arranged in two groups spaced from each other and, interposed between the two groups, are a plurality of brake cylinders circularly arranged in concentric relation to the axle of an individual wheel and axle assembly. Each brake cylinder is provided with two pistons movable in opposite directions to effect frictional engagement of the non-rotative and the rotative discs in the two groups.

It is an object of my invention to provide a brake control means of the rotary inertia type adapted to be embodied within and suited to a disc brake of the type described in my copending application Serial No. 225,785, referred to above.

In the case of a rotary inertia device having an inertia ring mechanically associated with the vehicle wheels, it is inevitable that the continued road shock on the wheels result in corresponding shock and stress on the parts of the rotary inertia device and possibly even undesired accidental operation thereof. It is accordingly another object of my invention to provide a rotary inertia device adapted to be mechanically associated with the vehicle wheels and including some means for cushioning the effect of road shock on the inertia device.

In a rotary inertia device adapted to successively close a series of switches according to the rate of acceleration or deceleration, it is imperative that the rotary inertia device be rendered inoperative immediately in the event of failure of the device to properly respond to the rate of acceleration or deceleration, as due to breaking of the usual resilient means yieldingly resisting movement of the inertia ring of the inertia device according to the degree of inertia force exerted thereon. It is accordingly another object of my invention to provide a rotary inertia device of novel construction adapted to automatically render all of the electrical circuits controlled by inertia device inoperative upon failure of the inertia device to properly respond to the rate of acceleration or deceleration of the train.

It is another object of my invention to provide a rotary inertia device of novel construction adapted to be associated with an individually rotatable vehicle wheel.

The above objects and other objects of my invention which will be made apparent hereinafter, are attained by several embodiments of my invention subsequently to be described and shown in the accompanying drawings wherein Fig. 1 is a plan view, partly in section, of a wheel and axle assembly showing in simplified form a disc brake device and a rotary inertia device constructed and arranged therein according to my invention, Fig. 2 is an enlarged sectional view taken on the line 2—2 of Fig. 1 showing, in detail, the construction of the rotary inertia device, Figs. 3, 4 and 5 are sectional views taken on the lines 3—3, 4—4 and 5—5 respectively of Fig. 2, showing further details of construction of the rotary inertia device, Fig. 6 is a partial plan view taken substantially on the line 6—6 of Fig. 2, showing in further detail the construction of the rotary inertia device, Fig. 7 is a diagrammatic simplified view, showing the electric circuit connections within the rotary inertia device itself and the collector ring arrangement whereby electrical connections are made to the rotating parts of the device, Fig. 8 is an enlarged sectional view taken substantially on the line 8—8 of Fig. 1, showing the plurality of brake cylinders circularly disposed in concentric relation to the axle of a wheel and axle assembly, Fig. 9 is a fragmentary view, showing a detail of the end cover shown in Fig. 8, Fig. 10 is an enlarged sectional view taken substantially on the line 10—10 of Fig. 1 and exactly on the line 10—10 of hereinafter referred to Fig. 12, showing the manner of mounting the collector rings and associated brush holder.

Fig. 11 is a plan view of a part of the brush holder shown in Fig. 10, showing the arrangement of the brushes therein;

Fig. 12 is a sectional view taken on the line 12—12 of Fig. 10 showing further details of construction.

Fig. 13 is an enlarged sectional view showing a second embodiment of a rotary inertia device adapted especially for use in connection with a disc brake device of the type shown in my copending application Serial No. 225,785 referred to above.

Figure 18:
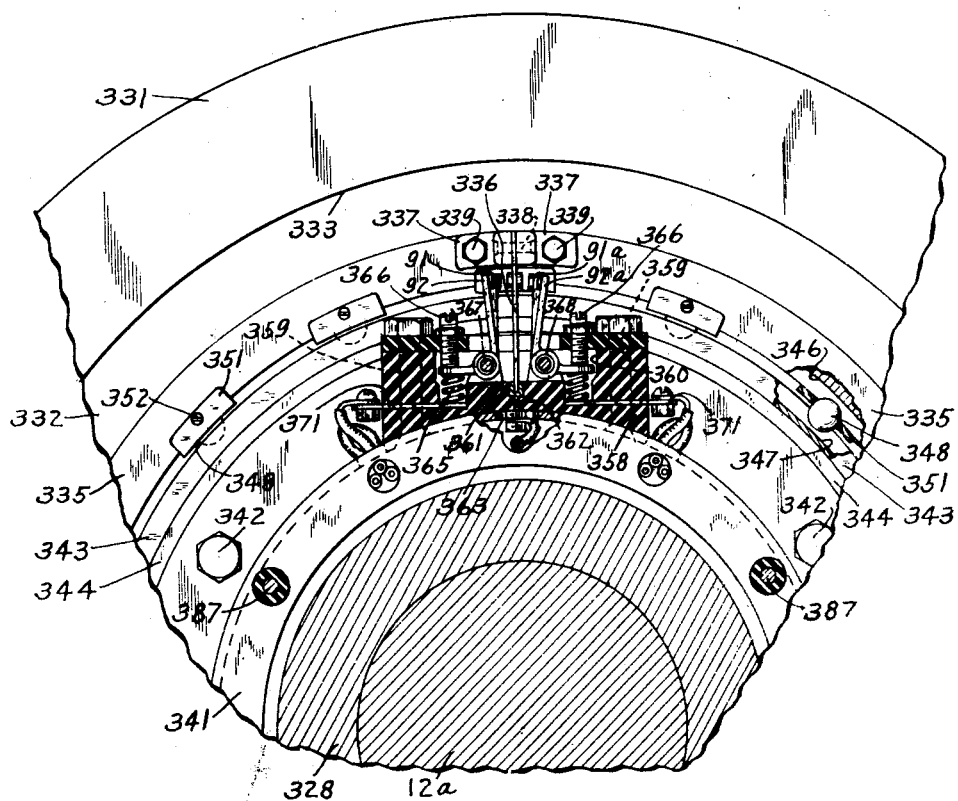

Fig. 14 is a sectional view taken on the line 14—14 of Fig. 13 showing further details of construction of the embodiment shown in Fig. 13, Fig. 15 is a sectional view, partly diagrammatic in form, showing internal electrical connections within the rotary inertia device of Figs. 13 and 14, and Fig. 16 is a sectional view taken on the line 16—16 of Fig. 13, showing further details of construction of the embodiment shown in Fig. 13, Fig. 17 is a vertical sectional view, showing a third embodiment of rotary inertia device adapted particularly for operation in connection with an individually rotatable vehicle wheel, and Fig. 18 is a sectional view taken on the line 18—18 of Fig. 17 showing in further detail the arrangement of parts and construction of the rotary inertia device shown in Fig. 17.

DESCRIPTION OF EMBODIMENT SHOWN IN FIGURES 1 TO 12

Figure 1:
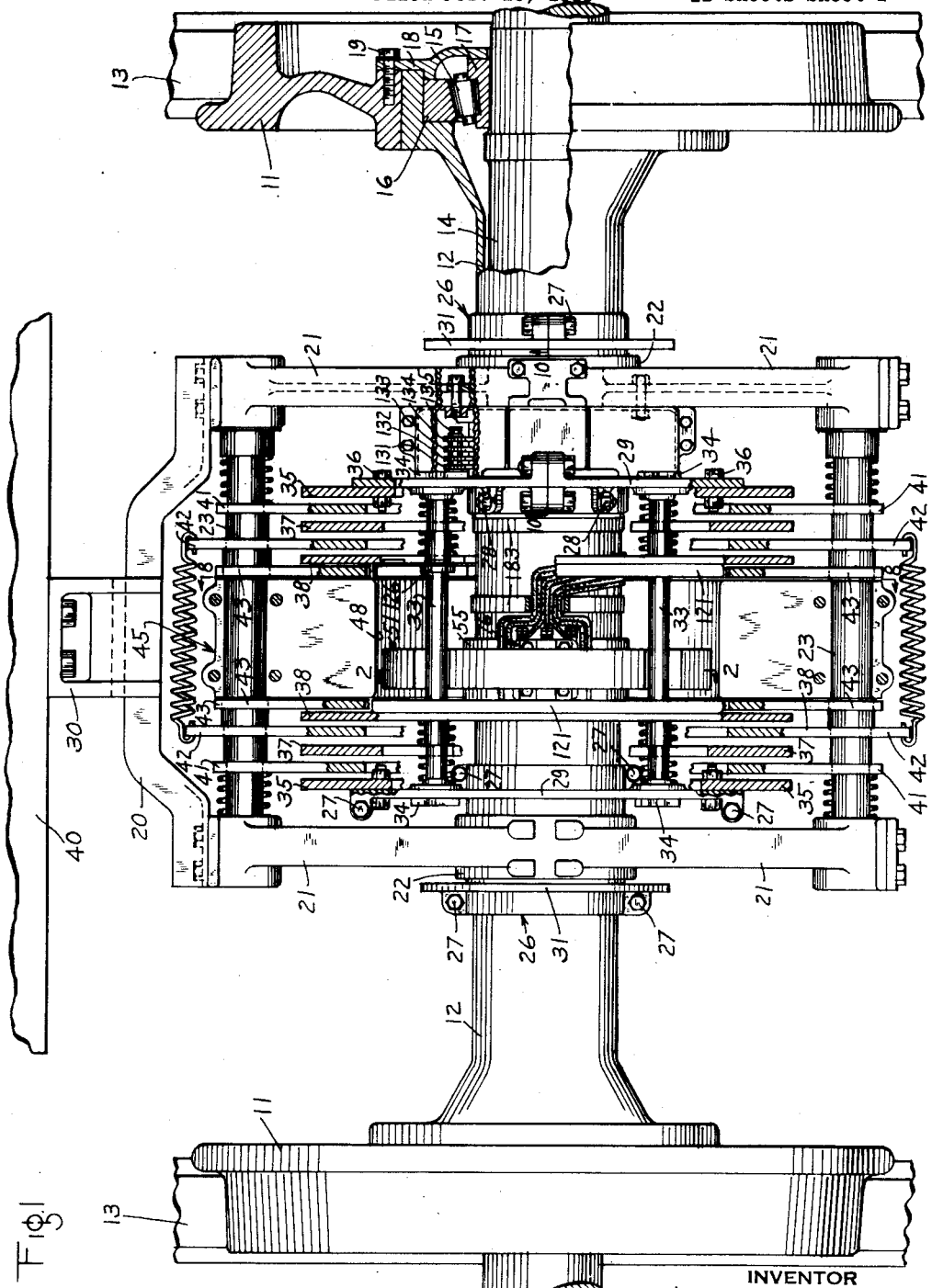

The first embodiment of my invention is shown in Figs. 1 to 12 inclusive of the accompanying drawings. Referring to Fig. 1, there is shown a wheel and axle assembly comprising a pair of vehicle wheels 11 secured at opposite ends respectively of a hollow tubular axle 12, as by a press fit, the two wheels being adapted to roll on opposite rails 13 of a railway track. The wheels 11 are rotatably mounted on a solid axle 14 which extends through the tubular axle 12 and projects beyond the outer face of each of the wheels 11 into journals suitably mounted and arranged in a wheel truck. The tubular axle 12 is provided at opposite ends with flanges or hubs of larger diameter than the central portion, and roller bearings 15 are disposed between bearing rings 16 and 17 secured, respectively, within the hubs of the tubular axle and in surrounding relation to the solid axle 14, to mount the wheels and the connecting tubular axle 12 for rotation in concentric relation to the solid axle 14.

A cover plate 18 having a central opening through which the solid axle 14 extends is secured, as by screws 19, to the outer face of the hub portion of the vehicle wheels 11 for holding the bearing rings 16 and 17 in position and adjusting the clearance of the roller bearings 15 between the bearing rings 16 and 17. The wheels 11 and the connecting tubular axle 12 thus rotate independently of rotation of the solid axle 14, although as a matter of fact, the axle 14 may rotate by virtue of the rotatable mounting thereof at opposite ends if suitably journaled as previously indicated.

Associated with the wheel and axle assembly, including wheels 11, is a disc brake of the type shown and described in detail in my above-referred to copending application Serial No. 225,785. Since the disc brake per se is not a part of my present invention, the parts of the brake are shown in simplified form but it should be understood that the brake device is intended actually to be of the form and construction shown in my copending application Serial No. 225,785.

Briefly, the disc brake apparatus shown in Fig. 1 comprises a supporting rectangular frame-work including side truss members 21 having suitable journals 22 midway of the opposite ends thereof whereby the truss members 21 are rockably supported on the outer surface of the tubular axle 12. The two truss members 21 are disposed in spaced relation with respect to each other along the tubular axle 12 and their corresponding ends on each side of the axle 12 are connected by a circular rod or shaft 23 preferably, as shown in Fig. 8, of tubular construction to reduce the weight thereof.

The truss members 21 are formed in two pieces adapted to be secured together at different points along the length thereof, as by suitable bolts 24 (see Fig. 12), the end portions being adapted to provide a suitable hub in which the ends of the connecting shaft 23 are clamped securely.

Each of the truss members 21 is provided at the hub portion thereof with a bushing or bearing ring 25 (Fig. 10) which in turn surrounds and engages in a suitable peripheral groove or recess in a sleeve 26 fixed to the axle 12. Sleeve 26 is formed in two complementary portions disposed around the outside surface of the tubular axle 12 and secured together in clamping relation to the axle as by a plurality of securing bolts and nuts 27.

The sleeve members 26 are, furthermore, securely fixed to the tubular axle 12 by means of suitable screws 28.

The rectangular supporting frame-work including the truss members 21 is held against rotation by a suitable connection with the wheel truck. As indicated, this may be accomplished by providing an end member 29 on the rectangular frame that extends into the recess of a yoke 30 attached to a fixed part of the wheel truck, such as the transverse strut or transom 40.

Each of the sleeve members 26 has a pair of circular radially extending flanges 29 and 31 formed by the cooperation of the two portions of each sleeve member, the flange 29 being at the inner end of the sleeve and the flange 31 at the outer end of the sleeve. The sleeve member 26 on which the right-hand truss member 21 in Fig. 1 is rockably supported is longer than the other sleeve member 26 so as to provide a greater distance between the two flanges 29 and 31 thereon for a purpose which will be hereinafter made apparent.

A plurality of rods or shafts 33, specifically illustrated as four in number, (see Fig. 8) are provided for connecting the radial flanges 29 of the two sleeve members 26, the rods 33 being disposed in substantially equally spaced relation to each other and in parallel relation to the tubular axle 12. The ends of the rods 33 are secured to the flanges 29 as by suitable nuts 34 screwed on the threaded outer ends of the rods 33.

To the inner face of each of the radial flanges 29 on the sleeve members 26 is secured, as by bolts 36, a braking element 35 in the form of a ring of suitable material such as cast iron.

There is also provided in associated relation with each of the flanges 29 a pair of brake elements 37 and 38 in the form of rings of suitable material, the rings 37 and 38 being disposed in concentric relation to the tubular axle 12 and in spaced axial relation with respect to each other and the corresponding flange 29. The rods 33, joining the two flanges 29, extend through close fitting openings in the brake rings 37 and 38, thereby slidably mounting the rings. The three brake rings 35, 37 and 38 associated with the flange 29 of each of the sleeve members 26 are thus adapted to rotate with the vehicle wheels 11 at all times.

A set of so-called non-rotative brake rings 41, 42 and 43 is provided for each set of rotative rings 35, 37 and 38, the brake rings 41, 42 and 43 being disposed in concentric relation to the tubular axle 12 in alternate arrangement with the rotative rings. More specifically the inner area of each ring 41 is interposed between the rotative brake rings 35 and 37, the inner area of ring 42 is interposed between the rotative rings 37 and 38, and the ring 43 is disposed on the opposite side of the rotative brake ring 38 to the ring 42.

The brake rings 41, 42 and 43 are provided with suitable openings at diametrically opposite points therein through which the shafts 23, connecting the side trusses 21 of the rectangular frame-work, extend in supporting relation.

Interposed between the two innermost non-rotative brake rings 43 is a brake cylinder housing 45, shown in detail in Fig. 8. As will be seen clearly in Fig. 8, the brake cylinder housing 45 is formed in two complementary portions and is suitably provided at the opposite ends thereof with journal portions for supporting the housing at opposite ends on the shafts 23 of the rectangular frame-work. The two portions of the housing 45 are secured together as by a plurality of bolts 47 at each of the journals at the opposite ends thereof.

As will be further evident in Fig. 8, the brake cylinder housing is generally annular in character and surrounds the tubular axle 12 in concentric relation. Each portion of the brake cylinder housing 45 has formed therein a plurality of brake cylinders 49 so spaced with respect to each other that when the two portions of the housing are assembled all of the brake cylinders are in substantially equally spaced relation with respect to each other. Obviously, the number of the brake cylinders 49 may be varied as desired, eight brake cylinders being shown specifically merely for purposes of illustration.

As described in detail in my copending application Serial No. 225,785, referred to above, each of the brake cylinders 49 contains two oppositely moving pistons arranged to have fluid under pressure admitted therebetween by suitable control means, each of the pistons being adapted to exert a force on the corresponding brake ring 43 so as to shift it along the tubular axle 12 and thereby cause all of the rotative brake rings 35, 37 and 38 and non-rotative brake rings 41, 42 and 43 to frictionally engage one another. With the rotative and non-rotative brake rings in frictional engagement with one another, the rectangular frame-work has a torque exerted thereon tending to cause rotation thereof with the vehicle wheels. The rectangular frame-work is, however, held against more than a slight limited amount of movement with respect to the wheel truck by the previously described connection with the transverse member or transom 40 of the wheel truck.

When the fluid under pressure is released from between the brake cylinder pistons, the brake rings are automatically restored to the normal separated positions thereof, as shown in Fig. 1, by the various release springs which are sufficiently obvious in character and operation from the drawings as to necessitate no description thereof herein.

In order to conserve space as well as to provide a compact arrangement of parts, I propose to utilize the space within the circular opening 48 in the brake cylinder housing 45 to contain a rotary inertia device adapted to operate in response to and register rates of acceleration and deceleration of the vehicle wheels 11. Referring to Figs. 2, 3, 4 and 5, it will be seen that the rotary inertia device comprises an inertia element or ring 51 that is rotatively mounted on the tubular axle 12 in a manner to be presently described. Inertia ring 51 has a relatively thin radially extending web 52, a relatively wide and thick outer rim or flange 53 and an inner flange 54 hereinafter referred to as the hub through which the tubular axle 12 extends.

A split ring member 55 is secured in concentric relation around the outer surface of the tubular axle 12 with an intervening cushioning ring 56 of resilient yieldable material, such as rubber, the purpose of which is to minimize the effect of road shock on the parts of the rotary inertia device. The hub 54 and the ring member 55 are provided with complementary substantially V-shaped peripheral grooves 57 and 58 respectively and the hub 54 of the inertia ring 51 so closely surrounds the ring member 55 as to confine a plurality of ball bearings 59 in the peripheral grooves, thereby constituting a substantially frictionless rotative mounting of the inertia ring 51 which serves at the same time to secure the inertia ring for rotation in a fixed place with respect to the tubular axle 12. The ball bearings 59 are held in fixed substantially equally spaced relation around the periphery of the ring member 55 by a plurality of spacers 61. The spacers 61 are in the form of short arcuate straps having at opposite ends thereof, circular openings large enough to accommodate the ball bearings 59, and midway of the ends a transversely extending portion or lug through which extends a screw 62 for securing the spacer to the ring member 55, each spacer accordingly holding two ball bearings in position, (see Fig. 5). It will be understood that the spacers 61 are of a thickness less than the clearance between the hub 54 and the ring 55 so as not to interfere with the free rotative movement of the inertia ring 51.

As a practical matter, the inertia ring 51 and the ring member 55 each comprise two similar and complementary half-portions adapted to be secured together after assembly around the tubular axle 12.

In order to insure true circularity of the inertia ring 51 and the ring member 55 they are both initially formed as a complete ring, all necessary machining operations being completed including the formation of the peripheral grooves 57 and 59 while the inertia ring and ring member are in integral form. When the machining operations on the inertia ring 51 are completed, suitable tapped holes are formed in the inner surface of the outer flange 53 of the inertia ring for receiving the securing bolts 65 of peripheral tie plate members 66 that are symmetrically disposed with respect to the intended diametrical line of severance of the inertia ring. It will be apparent that four of the tie plates 66 are provided, two on each side of the radial web 52 at one point in the periphery of the inertia ring and two on opposite sides respectively of the web 52 at a point diametrically opposite to the first two.

In a similar manner, prior to the severance of the inertia ring 51 into two portions, holes are suitably located in the web 52 of the inertia ring in symmetrical relation on opposite sides of the intended line of severance of the inertia ring for receiving securing bolts 68 for additional tie plates 67. It will be apparent that there are four of the tie plates 67, two on opposite sides of the web 52 at one point adjacent the hub 54 of the inertia ring and two on opposite sides respectively of the web 52 at a point diametrically opposite the first two.

The rods 33 connecting the radial flanges 29 of the sleeve members 26 extend through the space between the tubular axle 12 and wall of the brake cylinder housing 45 forming the circular opening 48. In order to provide an inertia ring 51 of as large a diameter as possible, without interference with the rods 33, it is necessary to cut recesses 69 in the rim 53 of the inertia ring 51 to enable the rods 33 to extend therethrough, the recesses 69 being of such size as to provide adequate clearance for the limited movement of the inertia ring 51 rotatively with respect to the tubular axle 12 that is permitted. Such recesses 69 weaken the rim 53 of the inertia ring and therefore two of the recesses 69 are located symmetrically with respect to the intended line of severance of the inertia ring 51 so that the tie plate 66 may act as reinforcing elements as well as elements for tieing the two portions of the inertia ring together.

In order to reinforce the rim 53 at the remaining recesses 69, additional reinforcing or tie plates 66 are provided, suitable holes being provided in the rim 53 of the inertia ring, for receiving the securing bolts 65 for the tie plates, prior to the severance of the inertia ring 51.

If desired, the tie plates 66 may be secured in position prior to the cutting of the recesses 69 since the recesses 69 extend into the tie plates 66, thereby enabling the portions of the recess 69 in the tie plates 66 to be cut at the same time that the portion of the recess 69 in the rim 53 and web 52 is cut. After the recesses 69 are cut, the tie plates 66 and 67 may then be removed and the inertia ring 51 cut into two half-portions along the diametrical line of severance. It will thus be seen that when the inertia ring 51 is reassembled in concentric relation to the tubular axle 12, it has a true circular form notwithstanding the portion of material removed during the process of severing the inertia ring 51 into two portions.

In a similar manner, the ring member 55 is machined on the inside and outside surfaces thereof and the peripheral groove 57 formed therein. Then, after locating the intended diametrical line of severance of the ring member 55 into two portions, tie straps 73 are clamped in position and suitable threaded bores and smooth bores are formed in the straps and ring member 55 for receiving screws 71 and dowel pins 72 respectively that secure opposite ends of the tie straps 73 to the two portions of the ring member 55. It will be seen (Fig. 4) that four tie straps 73 are provided, two on opposite sides respectively of the hub 54 of the inertia ring at one point on the ring member 55 and two on opposite sides respectively of the hub 54 of the inertia ring at a point on the ring member 55 diametrically opposite to the first point. After the holes for receiving the screws 71 and dowel pins 72 have been made in the tie straps 73 and ring member 55, the tie straps 73 are removed and the ring severed by cutting along the intended diametrical line of severance. It will accordingly be seen that when the ring member 55 is assembled in concentric relation around the tubular axle 12 the true circular form thereof is assured.

The rubber cushioning ring 56 is made in the form of a single strip that is bent around the tubular axle 12 so as to cause the two opposite ends thereof to abut each other in adjacent relation, the rubber ring 56 being manually held in position while the ring member 55 is being assembled on the tubular axle 12.

Obviously, the brake cylinder housing 45 may be assembled in concentric relation to the inertia ring 51 after the inertia ring 51 is mounted on the tubular axle 12. In the event of possible repairs to the rotary inertia device, access thereto may be had under service conditions merely by unscrewing the bolts 47 securing the two hub portions of the brake cylinder housing 45 together and removing the brake cylinder housing.

After the ring member 55 is assembled on the tubular axle 12, the ball bearing spacers 61 are secured in position. The ball bearings are then placed in two of the spacers on the top side of the axle and one half-portion of the inertia ring 51 placed over the corresponding portion of the ring member 55. The wheels and the tubular axle are then rotated through one hundred eighty degrees while holding the half-portion of the inertia ring in place and the ball bearings then inserted in the remaining spacers 61 now on the top side of the axle. The other half of the inertia ring is then placed in position and the two portions of the inertia ring secured together by means of the tie plates 66 and 67. With the ring member 55 fixed on the tubular axle, the inertia ring 51 is interlocked therewith by the ball bearings 59 and held against movement along the tubular axle 12 for rotation in a fixed plane between the vehicle wheels 11.

The web 52 of the inertia ring 51 has two openings 75 cut therein at diametrically opposite points, the openings extending from the hub 54 to the outer rim 53. The openings 75 are of substantially the same size so as not to disturb the dynamic or static balance of the inertia ring.

One of the openings 75 is adapted to receive a contact switch mechanism 76 and the other opening 75 is adapted to receive a bumper arrangement for limiting the degree of relative rotative movement between the inertia ring 51 and the ring member 55 secured to the tubular axle 12.

The contact switch mechanism includes a leaf spring 78 that is relatively wide at one end and tapered to a relatively narrow width at the opposite end, as shown in Fig. 3. The leaf spring 78 is disposed between and clamped along the wide end thereof between two separate blocks 79, of insulating material preferably of molded character, by two through bolts 82, the insulating blocks 79 and the wide end of the leaf spring 78 being provided with a suitable recess or groove 83 enabling the insulating blocks 79 to straddle the hub 54 of the inertia ring with clearance and to be secured to the ring member 55 on opposite sides of the web 52 of the inertia ring as by suitable bolts or screws 84 (see Fig. 6).

When so secured to the ring member 55, the leaf spring 78 extends radially outward within the opening 75 to a point approaching the inner surface of the rim 53 of the inertia ring 51 where the outer end is held securely and firmly between aligned knife edges formed on lugs 86 of insulating material that are secured by screws 87 to the inner surface of the rim 53 of the inertia ring 51.

It will thus be seen that the leaf spring 78 yieldingly resists rotative movement of the inertia ring 51 with respect to the ring member 75 and tubular axle 12 in either direction.

The provision of a radially oriented leaf spring has certain advantages over other types of resilient drive connections adapted to perform a similar function, in that the force of opposition which it exerts to resist relative movement between the inertia ring and axle is not subject to possible variation, during rotation of the axle, caused by centrifugal forces. It will be seen that since the centrifugal forces are exerted radially they do not affect the lateral bending strength of the spring.

The leaf spring 78 is provided on each side and adjacent the outer end thereof with a row of three contact tips 88 of any suitable material, such as silver. The contact tips on opposite sides of the leaf spring are in alignment and may be secured to the leaf spring as by spot welding each corresponding pair of contact tips together through a small opening in the leaf spring.

Figure 6:
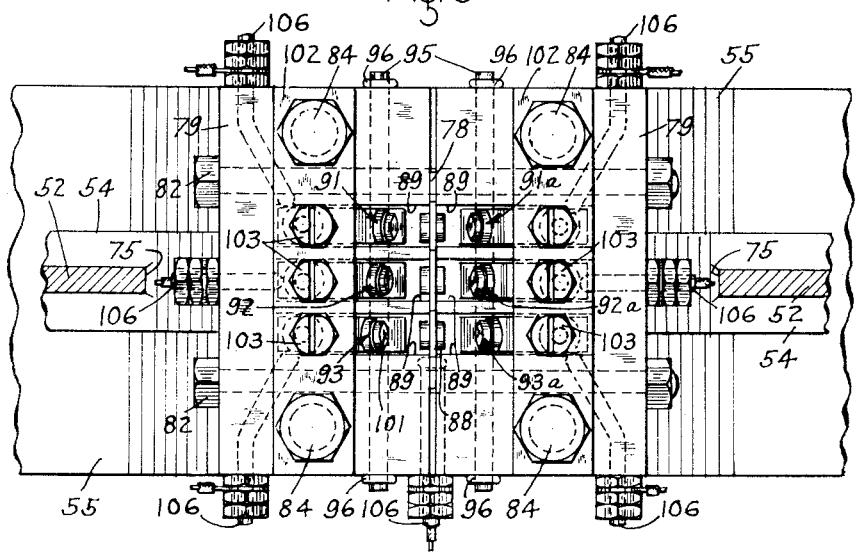

As seen especially well in Fig. 6, each of the insulating blocks 79 is provided with three adjacent parallel slots or recesses 89 open on the side engaging the leaf spring 78, and in each of the grooves 89 is received a contact finger in the form of a bell crank, the contact fingers on one side of the leaf spring 78 being identified by the reference numerals 91, 92 and 93 respectively and the corresponding contact fingers on the opposite side of the leaf spring 78 being identified by the reference numerals 91a, 92a and 93a respectively.

Each set of the contact fingers is pivoted at the fulcrum thereof on a steel pin 95 that extends transversely through the corresponding insulating block 79 and is held in position by spring collars 96 at opposite ends thereof that are adapted to snap into suitable peripheral grooves at the ends of the pin 95. Each of the contact fingers is provided with a bushing 97 of insulated material to insulate the contact fingers from the steel pin 95 and from each other. Each of the contact fingers has a relatively long arm 98 and a relatively short arm 99 as shown in Fig. 2, the long arm 98 extending radially outward at an angle to the leaf spring 78 and the short arm 99 extending away from the leaf spring into the corresponding slot 89. A contact tip 101 is secured to the outer end of the long arm 98 of each contact finger, as by welding or brazing, and the length of the long arm 98 of each contact finger is such that the contact tip 101 on each finger is adapted to be engaged by a corresponding contact tip 88 on the leaf spring 78 upon rotative movement of the inertia ring 51 relative to the tubular axle 12.

Each of the insulating blocks 79 has secured thereto on the outer surface thereof a transversely extending strap 102, of insulating material, and screwed into the strap 102 are three so-called stop screws 103, as shown in Fig. 6, so located in spaced relation as to extend respectively into a corresponding slot 89 in the corresponding insulating block 79. Interposed between the short arm 99 on each contact finger and the insulating block 79 is a small coil spring 104 that yieldingly rocks the arm 99 and consequently the contact finger in a direction toward leaf spring 78. The stop screws 103 which project into the slot 89 are engaged by the short arms 99 of the corresponding contact fingers to limit the movement of the contact fingers in the direction of the leaf spring 78 so that, normally, the contact tips 101 on the contact fingers are separated from the contact tips 88 on the leaf spring 78.

For a reason which will be hereinafter explained, the stop screws 103 for the contact fingers 91, 92 and 93 are so adjusted that the contact tips 101 on the three contact fingers are normally different distances away from the corresponding contact tips 88 on the leaf spring 78, the contact tip of the contact finger 91 being closest to the leaf spring, the contact tip of the contact finger 93 being farthest away from the spring, and the contact tip of the contact finger 92 being an intermediate distance away from the leaf spring.

In a similar manner, the contact fingers 91a, 92a and 93a on the opposite side of the leaf spring are normally positioned different distances away from the leaf spring by the corresponding adjusting screws 103.

It will thus be seen the arrangement of the contact fingers and the leaf spring 78 is such that when the inertia ring 51 shifts in one direction rotatively with respect to the ring member 55 and tubular axle 12, the contact tips 88 on the leaf spring successively engage the contact tips 101 on the contact fingers 91, 92 and 93 in succession as the displacement of the inertia ring from its normal position increases. In a similar manner, the contact tips 88 on the opposite side of the leaf spring successively engage the contact tips on the contact fingers 91a, 92a and 93a in succession with increasing displacement of the inertia ring 51 out of its normal position with respect to the ring member 55 and tubular axle 12.

As seen in Figs. 2 and 6, an individual terminal strap or bolt 106 is provided for each of the contact fingers and for the leaf spring. The terminal bolts 106 for the contact fingers are embedded in the insulating blocks 79, when molding the blocks, in such a manner that the inner end thereof is engaged by the biasing coil spring 104 for the corresponding contact finger, the outer end of each terminal post being threaded to receive nuts for securing an electric wire thereto.

In the case of the leaf spring 78, the insulating blocks 79 are suitably formed so as to accommodate the corresponding terminal post 106 which is secured to the wide end of the leaf spring 78 as by riveting it thereto. (See Fig. 3.) The outer end of the terminal post 106 of the leaf spring 78 is threaded to receive nuts for securing an electric wire thereto.

The specific arrangement of three contact fingers on each side of the leaf spring 78 is adapted for employment in connection with a brake control equipment of the type described and claimed in my prior Patent 2,132,959, or my copending application Serial No. 284,654, filed December 31, 1938. However, the number of contact fingers on each side of the leaf spring 78 may be varied or there may be more contact fingers on one side of the leaf spring than on the other, if desired, depending upon the particular brake control equipment with which the rotary inertia device is employed. For example, in my copending application Serial No. 248,653, filed December 31, 1938, the rotary inertia device may have only one contact finger on one side of the leaf spring and four contact fingers on the opposite side.

In order to enable the installation of the two insulating blocks 79 with leaf spring 78 secured in clamped relation therebetween, as a unit, into the opening 75 in the web of the inertia ring 51, a recess 109 is cut on the inner surface of the rim 53 at a point between the knife edge lugs 86 for receiving the outer end of the leaf spring thereinto while the mechanism is being inserted transversely into the opening 75.

The bumper mechanism 77, previously referred to, comprises a flanged yoke 111 which straddles the hub 54 of the inertia ring and is secured, as by a plurality of screws 112, to the ring member 55 (see Figs. 2 and 3). Secured in suitable recesses formed in the yoke 111, as by transversely extending pins 113, are a pair of oppositely facing bumper pieces 114 of yielding material such as rubber. Secured to the opposite edges of the web 52 of the inertia ring 51 and extending in opposite directions into the opening 75 in the web are a pair of stop lugs 115 that are adapted to be engaged by the corresponding bumper pieces 114 on the yoke 111 when the inertia ring 51 shifts rotatively relative to the ring member 55 and tubular axle 12 a distance slightly greater than that required to effect engagement of the leaf spring 78 with the farthest removed contact finger 93 or 93a. The bumper mechanism 77 accordingly functions to limit the flexing of the leaf spring 78 to a degree insufficient to cause breaking thereof.

In order to prevent as much as possible, the entry of dust, dirt or other foreign particles into the central opening 48 of the brake cylinder housing 45, which might interfere with the proper electrical contact between the contact fingers and the leaf spring 78, a pair of sheet metal end covers or discs 121 are provided as shown in Figs. 1 and 8. The end covers 121 are of substantially the same diameter as the central opening 48 in the brake cylinder housing and one is located at each end of the opening 48 between the innermost rotative brake ring 38 and the adjacent face of the brake cylinder housing 45, suitable openings 122 being provided therein through which the tie rods 33 connecting the radial flanges 29 of the sleeve members 26 extend.

Each of the end covers 121 is also provided with a large central opening 123 circular in form and having a slight clearance with respect to the outer surface of the tubular axle 12 which extends therethrough. Since the tie rods 33 extend through the end covers 121, the end covers obviously rotate with the rotative brake rings of the disc brake device and the tubular axle 12.

Each of the end covers 121 is formed by two semi-circular portions adapted to meet along a common diametrical edge. The two portions of each end cover may be secured together in any suitable manner, as in the manner shown in Figs. 8 and 9, by providing a series of spaced tongues 124 along the diametrical edge of each half-portion and staggering the tongues 124 on one half-portion with respect to the tongues on the other half-portion so as to interlock with each other.

The tie rods 33 are provided with suitable integrally formed collars 126 which are engaged by the end covers 121 to limit the inward movement thereof along the rods 33 to a point in close clearance with the brake cylinder housing 45. The end covers are engaged by the adjacent rotative brake rings 38 and urged slidably along the tie rods into contact with the collars 126 under the influence of the release springs for the rotative brake ring 38. When fluid under pressure is supplied to the brake cylinders 49 in the brake cylinder housing, the rotative brake rings 38 are shifted along the tie rods 33 away from the end covers 121 so that the force of the release spring of the rotative brake rings 38 urging the end covers 121 toward the brake cylinder housing is removed. However, in view of the close fit between the rods 33 and the openings 122 in the end covers, the end covers are frictionally held in position notwithstanding the disengagement of the rotative brake rings 38 therefrom.

It will be apparent that since the contact switch mechanism 76 is secured to and rotated with the tubular axle 12, some form of slip or collector ring arrangement is necessary to establish the electrical connection between the contact fingers of the switch mechanism and stationary parts of a brake control equipment with which the rotary inertia device is associated. As shown in Fig. 10, a collector ring arrangement is accordingly provided, comprising four collector rings 131, 132, 133 and 134 and a brush holder device 135 having a plurality of brushes 136, 137, 138 and 139 adapted to engage the collector rings 131 to 134 respectively.

The collector rings 131 to 134 are secured in concentric relation to the tubular axle 12 in suitably insulated axially spaced relation to each other along the tubular axle 12 by a plurality of securing bolts 141 that screw into the radial flange 29 of the right-hand sleeve member 26 shown in Fig. 1. In order to facilitate assembly around the tubular axle 12, the collector rings are split into two complementary half-portions. In order to insure true circular form for the collector rings, they are formed initially as integral rings and the necessary circular openings through which the securing bolts 141 extend bored therein prior to severance of the collector rings along a diametrical line. As seen in Fig. 12, each semi-circular half-portion of each collector ring is adapted to be secured by three bolts or screws 141, one adjacent each of the abutting ends of the two half-portions and one at an intermediate point therebetween.

As shown in Figs. 10 and 12, suitable metallic U-shaped connecting clips 144 are provided for connecting the two half-portions of each collector ring. As will be evident, each clip 144 straddles its associated ring and engages the opposite sides of the ring, and is provided with suitable circular openings through which the securing bolts 141 extend. Electric connection of wires to each of the collector rings is made by soldering or otherwise securing a wire to the clip 144 of the corresponding ring.

Referring to Fig. 11, the brush device 135 comprises a metallic supporting frame 148 that has a rectangular opening 149 therein for receiving a block of insulating material 151 in which are rectangular openings 152 for receiving the brushes 136 to 139. The metallic frame 148 is secured in insulated relation to a bracket 154 by a pair of screws 155 and the bracket 154 is, in turn, attached by four suitable screws 156 to a pedestal base formed on the hub portion 22 of the adjacent truss member 21 of the rectangular supporting frame of the disc brake. A cover member 158 of insulating material is secured to the metallic frame 148 by four securing bolts that screw into corresponding tapped holes 161 at the four corners of the metallic frame 148.

Suitable circular bores 162 are provided on the inner face of the cover 158 for receiving coil springs 163 that act to urge the brushes 136 to 139 into contact with their respectively associated collector rings. Since the coil springs 163 are larger in diameter than the width of the rectangular openings 152 in the insulating block 151, circular counter bores 164 are provided at the mid-point of each opening 152 to accommodate the coil springs 163 as they expand due to wear of the associated brushes.

A terminal post or strap 166 is provided for each of the brushes 136 to 139 respectively. The terminal post for each brush is suitably embedded in the molded insulating cover 158 in such a manner that the inner end thereof enters the recesses receiving the biasing springs 163 to the brushes and is engaged thereby, the outer end of the terminal post being threaded to receive suitable nuts for securing wires thereto.

The bracket 154 supporting the brush device 135 is provided with an extension that has an opening 167 through which the wires connected to the brushes extend. As shown particularly in Figs. 10 and 12, the bracket 154 is also provided with two laterally extending channel-shaped portions 168 extending in opposite directions from the opening 167 for receiving and supporting the wires connected to the terminal posts of the brushes, a suitable clip 169 and securing screw 170 therefor serving to hold the wires in place in the channel-shaped portions 168.

In order to protect the collector rings and the brush holder from dust, dirt and other foreign particles, a cover 172 of sheet metal is provided. As shown in Fig. 12, the cover 172 is formed as two cooperating portions adapted to be secured together by bolts 173 in surrounding relation to the collector ring and the brush holder, each portion of the cover 172 having a radially extending flange that has a central opening conforming closely to and having clearance with respect to the brush holder bracket 154 and the hub 22 of truss member 21. The portions of the cover 172 are secured to the truss member 21 by four bolts or screws 174, only two of which are visible in Fig. 12.

Figure 7:
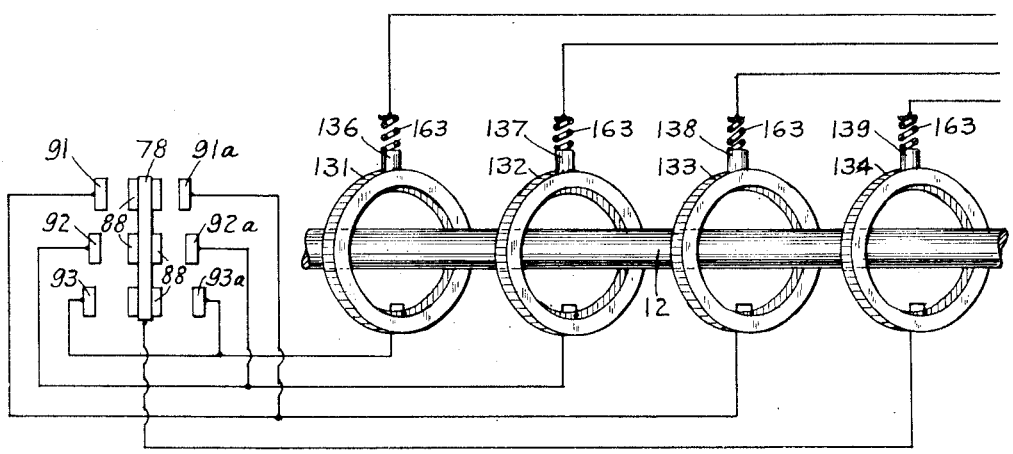

Referring to Fig. 7, the electrical connections between the contact fingers of the contact switch mechanism 76 as well as the leaf spring 78, and the collector rings 131 to 134 are shown diagrammatically. Briefly, each corresponding contact finger on opposite sides of the leaf spring 78 of the contact switch mechanism 76 is connected to the same corresponding collector ring and the leaf spring 78 is connected individually to its own collector ring. Thus, the corresponding contact fingers 91 and 91a on opposite sides of the leaf spring 78 are both connected, as shown, to the same collector ring 133. In a similar manner, the corresponding contact fingers 92 and 92a are connected to the same collector ring 132, and the corresponding contact fingers 93 and 93a are connected to the collector ring 131. Leaf spring 78 is connected to the collector ring 134. As a practical matter, there is an individual wire connecting each contact finger to its corresponding collector ring. The two wires from corresponding contact fingers on opposite sides of the leaf spring being connected to the same tie clip 144 of the corresponding collector ring.

Thus in Fig. 1, there are seven wires leading from the switch mechanism 76 to the collector rings 131 to 135. It will be understood that the radial flange 29 of the sleeve 26 surrounded by the collector ring is provided with suitable slotted openings 181 through which the wires connecting the contact fingers and leaf spring of the contact switch mechanism 76 to the collector rings, extend. A pair of clamping rings 183 are provided for holding the seven wires to the outside surface of the tubular axle against the action of centrifugal force.

*Operation*

No attempt will be made herein to describe in detail the operation of the rotary inertia device in a brake control equipment because such operation will be understood by reference to my copending application Serial No. 248,654, above referred to. A brief description of such operation of the rotary inertia device may be helpful, however.

Assuming, therefore, that an application of the brakes has been initiated and fluid under pressure supplied to the brake cylinders 49 of the disc brake device to cause the frictional engagement of the rotative and non-rotative brake rings thereof and a consequent rotative deceleration of the vehicle wheels 11, the inertia ring 51 tends to overrun the tubular axle 12 in one direction or the other depending upon the direction of rotation of the tubular axle. Assuming that the tubular axle 12 is rotating in a counterclockwise direction as seen in Fig. 2, the inertia ring 51 tends to shift rotatively relative to the tubular axle 12 in a counterclockwise direction upon the rotative deceleration of the tubular axle and the connected vehicle wheels 11. Obviously, the leaf spring 78 yieldingly resists the rotative displacement of the inertia ring 51 relative to the tubular axle 12 and the displacement of the inertia ring rotatively with respect to the tubular axle 12 is substantially in accordance with the rate of deceleration of the vehicle wheels.

As will be recalled from the previous description, contact fingers 91, 92 and 93 on one side of the leaf spring and the contact fingers 91a, 92a and 93a on the opposite side of the leaf spring of the switch mechanism 76 are normally adjusted by the adjusting stop screws 103 to require successively greater degrees of flexing of the release spring 78 to effect the engagement of a corresponding contact tip 88 of the leaf spring 78 with the contact tip 101 on the contact finger. In my copending application Serial No. 248,654, it is assumed that the engagement of the leaf spring 78 and contact fingers 91 and 91a occurs at a rate of rotative deceleration of the vehicle wheels corresponding to a rate of retardation of the car or train of 4.4 miles per hour per second. Obviously, engagement of the leaf spring 78 with either of the contact fingers 91 and 91a occurs upon the rotative deceleration or the rotative acceleration of the vehicle wheel depending upon which direction the inertia ring 51 shifts from its normal position. During any one application of the brakes, one of the contact fingers 91 and 91a is engaged by the leaf spring in response to the deceleration of the vehicle wheel and the other is engaged in response to the rotative acceleration of the vehicle wheel.

In a similar manner, the adjustment of the contact fingers 92 and 92a is such that they are engaged by the leaf spring 78 when the rotative deceleration or acceleration of the vehicle wheel attains a rate corresponding to a rate of retardation or acceleration of the car or train of 5.5 miles per hour per second.

In a similar manner also, the adjustment of the contact fingers 93 and 93a is such that they are engaged by the leaf spring 78 when the vehicle wheels rotatively decelerate or accelerate in excess of a rate corresponding to a rate of retardation or acceleration of the car or train of 7.7 miles per hour per second.

As will be understood from my copending application Serial No. 248,654, electroresponsive devices controlled respectively by electrical circuits including the leaf spring 78 and the contact fingers 91, 92, 91a and 92a, may be provided for regulating and controlling the pressure in the brake cylinders so as to regulate the rate of retardation of the car or train to a substantially uniform rate somewhere between the values of 4.4 and 5.5 miles per hour per second.

The coefficient of adhesion between the vehicle wheels and the track rails is such that rates of rotative retardation of the vehicle wheels in excess of a rate corresponding to a rate of retardation of the car or train of six miles per hour cannot be produced without exceeding the coefficient of adhesion and causing the wheels to slip. The contact fingers 93 and 93a, being thus set so as to be engaged by the leaf spring 78 only upon a rotative rate of retardation of the vehicle wheels corresponding to a 7.7 miles per hour per second rate of retardation of the car or train, are effective in the event that the vehicle wheels 11 begin to slip to set up certain control circuits, on which electroresponsive valve devices operate, for controlling the rapid release of the fluid under pressure from the brake cylinders of the disc brake associated with the vehicle wheels that begin to slip.

As will be evident from my copending application Serial No. 248,654, the engagement of the leaf spring 78 with the contact finger 93, assuming rotation of the vehicle wheels and tubular axle 12 in a counterclockwise direction as seen in Fig. 2, effects the instantaneous and rapid release of fluid under pressure from the brake cylinders 49 of the disc brake. When the slipping vehicle wheels cease to decelerate and begin to accelerate back toward a speed corresponding to car speed in response to the release of the brakes thereon, the inertia ring 51 tends to lag behind the vehicle wheels, and, since the vehicle wheels accelerate very rapidly back toward a speed corresponding to vehicle speed during the slipping interval, the consequent engagement of leaf spring 78 with the contact finger 93a is effected. The engagement of the leaf spring 78 with the contact finger 93a is effective to terminate the release of fluid under pressure from the brake cylinders 49 and initiate a controlled resupply of fluid under pressure thereto to effect reapplication of the brakes.

In my copending application Serial No. 248,654, a so-called direction coordinator of novel construction is provided so as to enable the contact fingers 93 and 93a to be connected in parallel relation, thus necessitating only one collector ring for the two contact fingers, instead of a separate collector ring for each contact finger.

Since the corresponding contact fingers 91 and 91a and the corresponding contact fingers 92 and 92a are connected in parallel relation and adjusted to the same setting respectively, it will be apparent that the rotary inertia device functions to control the rate of retardation on the car or train so as to regulate it to a substantially uniform rate regardless of which direction the wheels of the cars rotate.

EMBODIMENT SHOWN IN FIGS. 13 TO 16

Referring to Figs. 13 to 16, a second embodiment of a rotary inertia device adapted to be associated directly with the tubular axle 12 connecting the vehicle wheels 11 in the central opening 48 of the brake cylinder housing 45 shown in Fig. 1 is disclosed. The rotary inertia device shown in Fig. 13 comprises an inertia ring 251 that is mounted, in a manner presently to be described, for limited rotative movement relative to the tubular axle 12 in concentric relation thereto.

The inertia ring 251 is of a diameter somewhat smaller than that of the central opening in the brake cylinder housing 45 and a plurality of angularly spaced recesses 201 are formed or cut therein to provide the necessary clearance between the inertia ring and the tie rods 33 that extend through the central opening 48 of the brake cylinder housing 45 in parallel relation to the tubular axle 12 and connect the radial flanges 29 of the sleeve members 26 shown in Fig. 1.

Just as in the case of the inertia ring 51 of the first described embodiment, the inertia ring 251 is formed originally as an integral ring of true circular form and subsequently cut along a diametrically line into two similar half-portions. Prior to the separation of the inertia ring 251 into two portions, tie straps or plates 202 are clamped on opposite side surfaces of the inertia ring at the diametrically opposite points, in symmetrical relation to the intended line of severance, and holes for receiving securing bolts 203 therefor are located and bored through the plates 202 and the ring 251. The tie plates 202 are then removed and the ring 251 cut along the intended line of severance. It will thus be seen that when the two half-portions of the inertia ring 251 are assembled in concentric relation to the tubular axle and secured together by the tie plates 202 and bolts 203, the inertia ring 251 possesses a true circular form.

A sleeve member 205 is clamped in surrounding relation to the outer surface of the tubular axle 12 at a point within the projection of the side surfaces of the brake cylinder housing 45 thereon. The sleeve 205 is of split construction, being made up of two similar semi-circular half-portions which have cooperating lugs 206 thereon for receiving securing bolts 207. The wall of the sleeve 205 has a plurality of circular bores 208 extending radially therethrough and located at substantially equal angular distances apart around the periphery of the sleeve 205 at a point substantially mid-way between the opposite ends of the sleeve.

Prior to assembly of the sleeve 205 on the tubular axle, a tubular cage 209 is inserted through each of the bores 208, respectively, in a manner to extend radially outward from the axle 12, the cages 209 having a flange 211 at the inner end thereof of larger diameter than that of the main portion of the cage which is received in a counterbore 212 of the bore 208 so as to permit the sleeve 205 to be clamped in close surrounding contact with the outer surface of the tubular axle 12. A coil spring 213 is contained within each of the cages 209 in interposed relation between the outer surface of the tubular axle 12 and a collar or flange 214 of a rod 215 that projects radially outward in slidable relation through the outer circular opening 216 in the cage 209, the rod 215 carries at the outer end thereof a pin 217 on which a pair of rollers 218 located respectively on opposite sides of the rod 215 are rotatably mounted.

The inertia ring 251 has a central opening 221 therein and the edge of the inertia ring 251 at the central opening is provided with a peripherally extending groove or recess 222 of sufficient width so that each pair of rollers 218 for each cage 209 is received therein.

When the inertia ring 251 is assembled in concentric relation around the tublar axle 12 for rotative movement on the rollers 218, the coil springs 213 biasing the rollers 218 radially outward are slightly compressed so as to provide a slight clearance between the flange 214 on the roller-carrying rod 215 and the outer inwardly extending flange of the cages 209. The coil springs 213 are relatively heavy and the various springs in the several cages 209 exert substantially equal outward forces on the rollers 218 so that the inertia ring 251 is normally positioned in true concentric relation to the tubular axle 12.

The springs 213 serve as a cushioning means in somewhat the same manner as the rubber cushioning ring 56 of the first described embodiment, that is, they function to ease the mechanical stresses on the parts of the rotary inertia device resulting from rod shock on the vehicle wheels and the tubular axle 12 connecting the wheels.

The inertia ring 251 is adapted to be rotatively driven by rotation of the tubular axle 12 through a resilient connection that includes a pair of coil springs 225, a pair of bell-crank levers 226 and two additional pairs of levers, 227 and 228 respectively. The bell-crank levers 226 are disposed respectively on opposite sides of the inertia ring 251 and pivoted at the fulcrum thereof on a pin or screw 231 screwed into the ring 251. Each of the bell-crank levers 226 has a long arm 232 and a short arm 233. The coil springs 225 are suitably supported in interposed relation between the outer end of the short arm 233 of the respective bell-crank levers 226 and a corresponding angle bracket 234 secured as by screws 235 to the side surface of the inertia ring 251.

The other pairs of levers 227 and 228 are similarly arranged so that one of the levers of each pair is on one side of the inertia ring and the other lever of the same pair is on the opposite side of the inertia ring. The levers 227 and 228 on the same side of the inertia ring are pivotally connected at one end thereof as by a pin 237, the opposite end of the lever 227 being pivotally connected to the outer end of the long arm 232 of the bell-crank lever 226 on the same side of the inertia ring as by a pin 238, and the opposite end of the lever 228 being pivoted on a pin or screw 229 screwed into the inertia ring. The levers 226, 227 and 228 are preferably notched at the end thereof to provide lap joints so that the three levers 226, 227 and 228 on each side of the inertia ring are in the same plane of movement perpendicular to the tubular axle 12.

The distance between the fulcrum screw 231 and the pin 238 at the outer end of the long arm of the bell-crank lever 226 is substantially equal to the distance between the pivot screw 239 and the pin 237 of the lever 228. Also, the distance between the pins 237 and 238 at opposite ends of the lever 227 is substantially equal to the distance between the fulcrum screw 231 of the lever 226 and the pivot screw 239 of the lever 228. Accordingly, with the inertia ring 251 stationary, the coil springs 225 acting on the short arms 233 on the two bell-crank levers 226, position the levers 226, 227 and 228 on each side of the inertia ring 251 so that the levers 226 and 228 are substantially parallel and the lever 227 is substantially perpendicular to the long arm of lever 232 of lever 236 and to lever 228.

Mounted substantially mid-way between the fulcrum point of each bell-crank lever and the outer end of its long arm 232, as on a pin 241 fixed to the lever, is a roller 242, the rollers 242 being on the inside of each of the levers and extending toward each other within the central opening 221 of the inertia ring.

Suitably secured to the outer surface of the sleeve 205, as by screws 243, are a pair of so-called yoke straps 244. Each yoke strap 244 extends radially outwardly from the sleeve 205 and is of such contour as to form two converging cam surfaces 245 on the inside edge or surface thereof with which the roller 242 of a corresponding bell-crank lever 226 is associated. Each yoke strap 244 is normally symmetrically disposed with respect to its associated roller 242 on the bell-crank lever 246 and the two cam surfaces 245 on the yoke strap converge radially outwardly to an apex, in which the roller 242 is normally positioned.

The coil springs 225 are so designed and are of such strength as to maintain the rollers 242 in the apex between the two converging cam surfaces 245 on the associated yoke strap 244 as long as the tubular axle 12 and inertia ring 251 rotate at substantially the same speed. When the brakes are applied to the tubular axle 12 and it consequently tends to rotate at a slower speed than the inertia ring 251, the rollers 242 roll up one or the other of the inclined cam surfaces 245, depending upon the direction of rotation of the axle 12, so that the bell-crank lever 226 is pivoted on its fulcrum screw 231 in a counter-clockwise direction, as seen in Fig. 13, against the yielding resisting force of the coil springs 225. Thus, assuming that the tubular axle 12 is decelerated while rotating in a clockwise direction, the rollers 242 roll up the right-hand cam surface 245 and the bell-crank lever 226 is rocked in a counter-clockwise direction. The springs 225 yield in a manner to cause the rotative displacement of the inertia ring 251 forwardly of its normal position with respect to tubular axle 12 to correspond substantially to the rate of rotative deceleration of the tubular axle 12 and the connected vehicle wheels 11.

Conversely, if the vehicle wheels and the connecting tubular axle 12 are accelerated, the cooperative action of one or the other of the cam surfaces 245 with the associated rollers 242, also causes the bell-crank levers 226 to be pivoted in a counter-clockwise direction to compress the springs 225. Thus, assuming that the tubular axle 12 is accelerated in a clockwise direction, as seen in Fig. 13, the left-hand cam surface 245 on the yoke strap 244 cooperates with the roller 242 to cause counter-clockwise pivotal movement of the bell-crank lever 226. Just as in the case of the deceleration of the tubular axle 12, so for acceleration of the vehicle wheels, the coil springs 225 yieldingly permits rotative displacement of the inertia ring 251 backwardly of its normal position with respect to the tubular axle 12 an amount which corresponds substantially to the rate of rotative acceleration of the vehicle wheels and tubular axle 12.

It will be apparent that the two pairs of levers 227 and 228 serve to support the outer end of the long arm 232 of the bell-crank lever 226 while permitting free movement thereof in accordance with the cooperative action of the rollers 242 on the bell-crank levers 226 and the cam surfaces 245 on the yoke strap 244. It would be possible to omit the levers 227 and 228 but this construction would disturb the static and dynamic balance of the inertia ring 251. Accordingly the pairs of levers 227 and 228 are provided so as to secure a static and dynamic balance of the inertia ring.

In order to utilize the rotative shifting of the inertia ring 251 relative to the tubular axle 12 to register the rate of deceleration or acceleration of the vehicle wheels for a desired purpose, such as the control of the brakes associated with the vehicle wheels, a switch mechanism 255 is provided. The switch mechanism 255 comprises two angle brackets 256 and 257, (Figs. 14 and 15) of insulating material, secured as by screws 258 to the sleeve 205 and located in spaced axial relation along the sleeve. A pair of brushes 259 are slidably mounted in an insulating sleeve or bushing 261 that is retained in a circular bore 262 of the inertia ring 251 parallel to the tubular axle 12, the brushes 259 being urged in opposite directions into contact with the surface of the brackets 256 and 257 by a coil spring 263 interposed between the inner ends of the brushes within the insulating bushing 261.

The insulating bracket 257 has an arcuate contact segment 265 inset in the inside face thereof and adapted to be engaged by one of the brushes 259 at all times. The contact segment 265, as shown in Fig. 15, is symmetrically disposed with respect to the normal position of the associated brush 259 and is sufficiently long that the brush 259 remains constantly in engagement therewith as the inertia ring 251 shifts rotatively relative to the tubular axle 12. A terminal post 266 formed integrally with the segment 265 extends through the insulating bracket 257 and is threaded on the outer end thereof to receive a nut for securing an electrical wire thereto.

The insulating bracket 256, as shown in Fig. 15, is provided with a plurality of short contact segments 291, 292, 293, 291a, 292a and 293a inset in the inner face thereof and arranged in spaced arcuate manner in alignment with the second brush 259. Three of the segments are disposed on one side of the normal position of the brush 259 and the other three on the opposite side of the normal position of the brush. Furthermore, due to the spacing between the segments, brush 259 normally engages the surface of the insulating bracket 256 between the inner two contact segments. Thus, when the inertia ring 251 shifts rotatively with respect to the tubular axle 12 in one direction out of its normal position, the brush 259 successively engages the contact segments 291, 292 and 293 in the order named; and when the ring shifts rotatively in the opposite direction out of its normal position, the brush 259 successively engages the contacts segments 291a, 292a and 293a in the order named. Each segment is provided with a terminal post that extends through the bracket 256 and is threaded on the outer end thereof to receive a nut for securing an electric wire thereto.

For purposes of illustration, the contact segments 291 and 291a may be so located that the brush 259 is shifted into respective engagement therewith only when the rate of deceleration or acceleration of the vehicle wheels exceed a certain rate corresponding, for example, to a rate of deceleration or acceleration of the car or train of 4.4 miles per hour per second. In a similar manner, the location of the contact segments 292 and 292a may be such that they are not engaged by the brush 259 associated therewith until the rotative deceleration or acceleration of the vehicle wheels exceeds a rate corresponding to 5.5 miles per hour per second retardation or acceleration of the car or train. In a similar manner also, the contact segments 293 and 293a may be so located that they are not engaged by the brush 259 associated therewith until the rotative deceleration or acceleration of vehicle wheels exceeds a rate corresponding, for example, to a rate of retardation or acceleration of the train of 7.7 miles per hour per second.

As further shown in Figs. 14 and 15, a plurality of contact fingers or brushes 271, 272, 273 and 274 are pivotally mounted side-by-side in insulated relation on a supporting pin 275 that is supported at opposite ends in and secured to the spaced insulating brackets 256 and 257. The outer ends of each contact finger is provided with a suitable contact tip 270 that engages a corresponding one of a plurality of slip or collector rings 281 to 284 mounted in the central opening of the brake cylinder housing 45. Each of the contact fingers 271 to 274 is yieldingly biased into contact with its corresponding slip ring as by a coil spring 285 that is interposed between the outer end of the contact finger and a rigid strut 286, of insulating material, supported at opposite ends by the two insulating brackets 256 and 257 in a radial line outwardly of the brushes 259. It will thus be apparent that contact fingers 271 to 274 rotate with the tubular axle 12 and continuously engage their respectively associated stationary slip rings 281 to 284 as the vehicle wheels rotate.

Interposed between each coil spring 285 and the supporting strut 286 is a metallic washer or ring 287 to which an electric wire may be connected, as by soldering, thus in effect connecting the wires to the contact fingers.

As shown in diagrammatic form in Fig. 15, a wire 304 is provided for connecting the terminal post 266 of the contact segment 265 to the contact finger 274. The terminal posts for the contact segments 291 and 291a are connected together and to the contact finger 271 by a wire 301. The terminal posts of contact segments 292 and 292a are connected together and to the contact finger 272 by a wire 302. The terminal posts of contact segments 293 and 293a are connected together and to the contact finger 273 by a wire 303.

It will thus be seen that the engagement of the one brush 259 with contact segments 291, 292 and 293, in succession, correspondingly successively connects the slip ring 284 to the slip rings 281, 282 and 283. In like manner, the successive engagement of brush 259 with contact segments 291a, 292a and 293a correspondingly successively connects slip ring 284 to the slip rings 281, 282 and 283.

The slip rings 281 to 284 are secured to an insulating sleeve or bushing 305 that is in turn secured to the brake cylinder housing 45 within the central opening thereof.

For convenience of assembly, the insulating sleeve 305 and the slip rings 281 to 284 are in the form of two similar and complementary half-portions originally in circular form and later severed, after machining and boring operations thereon are completed, in the same manner as the inertia ring 251. The portions of the insulating sleeve 305 are secured within the central opening of the brake cylinder housing 45, as by a plurality of screws 306 shown in Fig. 13. The slip rings 281 to 284 are secured to the insulating bushing 305 as by flat-head screws 307 that are received in countersunk bores in the slip ring, the heads of the screws being flush or slightly sunk with respect to the sliding contact surface of the slip rings so as not to interfere with the contact of the associated contact fingers therewith.

The insulating bushing 305 is provided with integrally formed ribs 308 extending parallel to the tubular axle 12 and adapted to be received in corresponding recesses in the brake cylinder housing 45 to provide the necessary thickness of the bushing to receive the securing screws 307 for the slip rings as well as to lock the bushing against turning in the brake cylinder housing.

The cooperating ends of the two half-portions of the insulating bushings 305 are suitably recessed to receive metallic connectors or tie straps 309 to electrically connect the two half-portions of each individual slip ring.

The insulating bushing or sleeve 305 is preferably formed by a molding process and a plurality of terminal posts 311, 312, 313 and 314 for the slip rings 281 to 284, respectively, are embedded therein as shown in Fig. 14. One end of each of the terminal posts 311 to 314 is open to the inner surface of the insulating bushing 305 and is adapted to be engaged by the outer surface of the corresponding slip ring. To insure firm contact of each slip ring with its terminal post, securing screws 307 extending through the slip ring and into the terminal post may be provided. The insulating bushing 305 has two bosses 316 formed thereon which extend radially outward through suitable openings provided in the tubular hub wall of the brake cylinder housing 45 surrounding its central opening and the terminal posts 311 to 314 are suitably formed and disposed so that the outer ends thereof project out of the bosses 316, the outer ends of the terminal posts being threaded to receive suitable nuts for securing electrical wires thereto.

The rotary inertia device shown in Figs. 13 to 16 may be adapted to various applications just as the first described embodiment. In view of the illustrative description of the operation of the first embodiment of the rotary inertia device, it is deemed unnecessary to describe the operation of the present embodiment in a particular application.

Embodiment Shown in Figs. 17 and 18

Referring to Figs. 17 and 18, a third embodiment of a rotary inertia device is shown adapted to a wheel and axle assembly having individually rotatable vehicle wheels as distinguished from a pair of rotationally connected wheels. In Fig. 17, an individual car wheel 11, having a hub 325 in which is contained a suitable sleeve or bushing 326, is rotatably mounted by ball or roller bearing 327 on a sleeve 328 pressed over a supporting axle 12a that is non-rotatively mounted in the wheel truck in any suitable manner. It will be understood that a vehicle wheel 11 is located at opposite ends of each axle 12a and engages opposite rails of the track. The details of the journal housing at the end of the axle 12a are omitted as they are unnecessary to an understanding of my invention.

The hub 325 of the vehicle wheel 11 is provided on the inner end with a radially extending flange 329 to which a brake element in the form of a brake ring or drum 331 is secured by means of an intervening web element 332. The web element 332 may be welded to the brake ring 331 and the flange 329 on the hub of the vehicle wheel or it may be secured thereto by means of screws or bolts not shown. When the wheel 11 is mounted on the axle 12a the brake ring 331 concentrically surrounds the axle which extends through the large circular opening 333 in the brake ring 331.

For simplicity, the brake shoes or similar elements for engaging the brake ring 331 to exert a braking force on the wheel 11 are omitted. It should be understood, however, that clasp arrangement of brake shoes may be provided for gripping the peripheral surface of the brake ring 331 or the brake shoes may be mounted so as to frictionally engage the radially extending side surfaces of the brake ring.

The rotary inertia device associated with the vehicle wheel 11 comprises a rotary inertia element or ring 335 that is rotatably mounted, in the manner presently to be described, on the inner end of the hub 325 of the car wheel 11 and which is driven by rotation of the car wheel through a flexible resilient connection in the form of a leaf spring 336.

The leaf spring 336 is made of any suitable material such as stainless steel, being wide at one end and tapered toward a point at the opposite end. The spring 336 is disposed in a longitudinal plane through the axis of the axle 12a, that is, the spring extends radially outward from the axle 12a. The outer or wide end of the spring 336 is secured between two angle brackets 337 as by screws or rivets 338, the brackets being secured to the radially extending side surface of the inertia ring 335 by screws 339, as shown in Fig. 18. The angle brackets 337 are insulating material to insulate the leaf spring 336 from the inertia ring 335.

The inner or pointed end of the leaf spring 336 is secured, in a manner presently to be described, to a tubular member 341 that is fitted over the outer end of the axle 12a before the wheel is mounted thereon and then secured to the hub 325 of the wheel 11 by a plurality of screws 342 that extend through a radial flange in a tubular member and into the inner end of the hub 325.

The outer end of the tubular member 341 concentrically surrounds the inner end of the hub 325 of the vehicle wheel 11 and has secured to the outer surface thereof a ring member 343. The ring member 343 is not secured directly to the tubular member 341 but is separated therefrom by a cushioning ring 344 of suitable material, such as rubber. The ring member 343, the cushioning ring 344 and the tubular member 341 may be secured together in any suitable manner as by bonding the ring member 343 to the outer surface of the cushioning ring and by bonding the tubular member 341 to the inner surface of the cushioning ring.

The inertia ring 335 is fitted over the outer end of the axle 12a and is arranged in concentric surrounding relation to the ring member 343.

The inertia ring 335 is provided on the inner surface thereof and the ring member 343 is provided on the outer surface thereof with complementary registering peripheral grooves 346 and 347 respectively, in which grooves a plurality of ball bearings 348 are received to support the inertia ring 355 rotatively on the ring member 343.

The ball bearings 348 are introduced into the annular space formed between the grooves 346 and 347 when the inertia ring 345 is surrounding insulated relation to the ring member 343, through a transverse slot 349 on the inner surface of the inertia ring which opens transversely out of the groove 346 on the side surface of the inertia ring. The ball bearings 348 are individually held at fixed points in spaced angular relation with respect to one another by forked brackets 351 of L-shape, the forked flange of the bracket 351 extendng between the inertia ring 335 and the ring member 343 and straddling the ball bearing, while the outer flange of the bracket is secured to the radial side surface of the inertia ring as by screws 352.

The inertia ring 335 has an integrally formed lug 353 thereon which extends radially inward between two spaced lugs 354, only one of which is shown in Fig. 17, formed on or attached to the ring member 343. Normally, as will hereinafter appear, the lug 353 is mid-way between the lugs 354 and engage either of the lugs when the inertia ring 345 is shifted a limited distance rotatively relative to the ring member 343 to limit the flexing of the leaf spring 336 as will appear later.

After the tubular member 341 is fitted over the outer end of the axle 12a, but before the wheel 11 is installed, an oil throw ring 356 is fitted over the axle and secured by screws 357 to a shoulder formed on the sleeve 328 which is fixed to the axle 12a.

Secured to the tubular member 341, in longitudinally spaced relation with respect to the ring member 343 and on a portion of the tubular member of reduced diameter is an insulating base or block 358 which carries a plurality of contact fingers that cooperate with the leaf spring 336 to form a switch mechanism responsive to the relative rotative movement between the inertia ring and the vehicle wheel 11.

The insulating base 358 may be secured to the tubular member as by a plurality of studs or bolts 359 in the manner shown in Fig. 18.

The insulating base 358 is provided with a central recess 360 and the inner tapered end of the leaf spring 336 extends into the recess 360 and is firmly secured to the insulating base at the bottom of the recess in a U-shaped clip 361. The clip 361 is provided with an integrally formed terminal post 362 to extend radially inward and through a suitable opening 363 in the wall of the tubular member at the portion of reduced diameter, the outer end of the terminal post 362 being threaded to receive a nut for securing the clip to the insulating base and another nut for securing an electric wire to the terminal post.

Any desired number of the contact fingers previously mentioned may be provided on one or both sides of the leaf spring 336. For purposes of illustration, a switch mechanism for performing the identical functions of the switch mechanisms in the prior embodiments described is provided which includes three contact fingers 91, 92 and 93 on one side of the leaf spring and three contact fingers 91a, 92a and 93a on the opposite side of the leaf spring. The contact fingers are like the contact fingers of the first described embodiment, that is, they are in the form of bell-crank levers with a long arm carrying a suitable contact tip on the outer end thereof for engaging a corresponding contact tip on the leaf spring 336, and a short arm which is biased upwardly by a coil spring 365 into contact with the inner end of an adjusting stop screw 366.

The contact fingers are pivotally mounted in the recess 360 of the insulating base 358 on transverse metallic pins 367 suitably supported at opposite ends in holes drilled in the insulating base, the contact fingers having suitable bushings 368 of insulating material at the fulcrum thereof for insulating the contact fingers from the metallic pivot pin 367. The contact fingers on each of the pivot pins 367 are separated from each other by suitable spacing washers or rings 369 of insulating material.

A terminal post 371 is provided for each of the contact fingers, the post being embedded in the insulating base during the process of molding the base. The inner end of each terminal post is engaged by one end of the biasing spring 365 for the contact fingers and the outer end is suitably perforated to receive a securing bolt for an electric wire.

As in the case of the first embodiment, the contact fingers of the present embodiment on each side of the leaf spring 336 are normally adjusted different distances out of contact with the leaf spring. Thus the outer end of contact fingers 91 and 91a are spaced a given distance from the corresponding contact tip on the leaf spring and the outer ends of contact fingers 92, 92a and 93 and 93a are spaced successively greater distances from the leaf spring.

Accordingly, it will be seen that when the inertia ring 335 shifts rotatively in one direction with respect to the vehicle wheel 11, the leaf spring 336 is correspondingly increasingly flexed so as to successively engage contact fingers 91, 92 and 93 and, when the shift is in the opposite direction, to successively engage the contact fingers 91a, 92a and 93a.

Just as in the case of the first embodiment also, the adjustment of the contact fingers and the design of the leaf spring 336 may be such as to cause the leaf spring to engage the contact fingers at different desired rates of acceleration or deceleration of the vehicle wheel. For simplicity, it is assumed that in the present embodiment, the leaf spring engages the contact fingers at rates of rotative deceleration or acceleration of the vehicle wheel which are the same as the values previously given in connection with the first described embodiment.

For the purpose of providing electrical connections to the leaf spring 336 and the contact fingers associated therewith from a stationary point, four collector rings 381, 382, 383 and 384 and a suitable brush holder 385 similar to that shown in detail in Fig. 10 and described in connection with the first embodiment is provided. Unlike the collector rings of the first embodiment, the collector rings 381 to 384 are of integral construction and not split, the rings being suitably secured in insulated relation with respect to each other and to the inner radial flange of the tubular member 341, as by a plurality of screws 387. It will be seen that by securing the collector rings to the inner end of the tubular member 341, they are automatically positioned in concentric relation to the axle 12a when the tubular member 341 is secured to the inner end of the hub 325 of the car wheel 11.

The brush holder 385 corresponds in construction, if not exact dimensions, to the brush holder 135 of the first embodiment shown in Fig. 10 and a detailed description thereof is therefore deemed unnecessary, it being sufficient to state that four brushes are supported thereby for respectively engaging the collector rings.

The brush holder 385 is secured by a bracket 388 similar to the bracket 154 of Fig. 10 to a split ring 389, the two portions of which are secured together in surrounding clamping relation to the inner end of the sleeve 328 in a manner not shown. The bracket 388 is secured by screws 391 to a suitable pedestal formed on the upper portion of the split ring 389.

The leaf spring 336 and the contact fingers associated therewith are connected to the collector rings 381 to 384 in a manner similar to that of the leaf spring and associated contact fingers of the first described embodiment, as illustrated in Fig. 7. It is unnecessary, therefore, to specifically show the connections of the contact fingers and leaf spring of the present embodiment to the collector rings except to point out that as shown in Fig. 17, the terminal post 362 for the leaf springs 336 is connected by a wire to the collector ring 381, the end of the wire being suitably attached to the ring as by soldering thereto. Furthermore, it should be understood that, as in the first embodiment, the corresponding contact fingers on opposite sides of the release spring are connected to the same collector ring.

Although not shown, it should be understood that a suitable housing or casing may be provided for shrouding the entire rotary inertia device to keep out dust and dirt or other foreign particles from the rotary inertia device.

In operation, the rotary inertia device of the present embodiment is adapted to function in a brake control equipment of the type described in my previously referred to application Serial No. 248,654, in the same manner as previously explained in connection with the first embodiment of rotary inertia device. The primary difference between the present embodiment and the first embodiment lies in the fact that the rotary inertia device of the present embodiment registers the rate of rotative acceleration and deceleration of an individual wheel, whereas the rotary inertia device of the first embodiment registers the rate of rotative acceleration or deceleration of a pair of rotatively connected wheels. The rotary inertia device of the present embodiment differs also from that of the first described embodiment in that it permits all of the rotating parts thereof to be formed as integral members instead of split members as required in the construction of the rotary inertia device of the first embodiment.

It should be noted that the rotary inertia device employed in the brake control equipment of my prior application, Serial No. 248,654, is substantially identical to the present embodiment of rotary inertia device.

Summary

Summarizing, it will be seen that I have disclosed herein three embodiments of a rotary inertia device associated directly with and responsive to the rate of rotative deceleration and acceleration of a vehicle wheel or wheels. Each embodiment comprises essentially an inertia ring which is mounted in concentric relation with a wheel and axle assembly and adapted to be driven through a resilient yielding connection permitting limited rotative movement of the inertia ring with respect to the car wheel in opposite directions.

In two of the embodiments a leaf spring forms the resilient yielding connection between the inertia ring and the car wheels, the leaf spring being adapted to cooperate with contact fingers carried by an element rotatable with the car wheels to control various brake control circuits. This arrangement has the advantage that if the leaf spring should break, then all of the circuits controlled thereby are interrupted, and the rotary inertia device is thereby rendered ineffective so that the brakes may be controlled by the operator in the normal manner without regulation by the rotary inertia device.

In order to protect the inertia ring and other parts of the rotary inertia devices of all embodiments against excessive shock and stresses thereon due to the road shock on the car wheels as well as to minimize the possibility of undesired operation, cushioning means is provided in all embodiments between the inertia ring and the supporting axle or the car wheel. In two embodiments the cushioning means is a rubber ring while in the remaining embodiment the cushioning means is in the form of radially disposed coil springs.

In two of the embodiments of the rotary inertia devices, rotary collector rings and stationary brushes are provided for establishing electrical connection from a stationary point to the rotatable switch mechanism on the rotary inertia devices. In the remaining embodiment, the electrical connection to the rotating parts of the rotary inertia device is established by means of stationary collector rings and movable brushes or contact fingers on a rotary part of the rotary inertia device.

Two of the embodiments of the rotary inertia devices are embodied in a disc brake having a stationary brake cylinder housing surrounding the axle connecting two vehicle wheels, the rotary inertia device being disposed concentrically within the annular space between the circular brake cylinder housing and the wheel axle. The remaining embodiment of rotary inertia device is illustrated as applied to an individually rotatable car wheel, being associated with the inner end of the hub of the wheel.

As illustrated, all embodiments of the rotary inertia device are adapted to function in connection with a brake control equipment of the type disclosed, described and claimed in my copending application, Serial No. 248,654. It should be understood, however, that they are not limited in their application to such type of brake control equipment but may be suitably altered as desired, particularly with reference to the adjustment, number and arrangement of the contact fingers of the switch mechanisms included therein, for employment in connection with any indication or control equipment.

While I have shown only three specific embodiments of my invention, it should be understood that various omissions, additions or modifications may be made in the embodiments shown without departing from the spirit of my invention. It is accordingly not my intention to limit the scope of my invention except as it is necessitated by the scope of the prior art.

Having now described my invention, what I claim as new and desire to secure by Letters Patent, is:

1. A rotary inertia device for registering the rotative condition of a vehicle wheel, comprising a member rotatable with the vehicle wheel, a rotary inertia element, means for mounting said inertia element rotatably on said rotatable member and including cushioning means for absorbing shocks tending to urge the inertia member laterally of the rotatable member, resilient yielding means providing a driving connection between said rotatable member and inertia element and adapted to permit rotative movement of the inertia element relative to the rotatable member upon changes in the speed of rotation of the rotatable member, and means actuated in response to the relative rotative movement between the inertia element and the rotatable member.

2. A rotary inertia device for registering the rotative condition of a vehicle wheel, comprising a member rotatable with the vehicle wheel, an annular rotary inertia element, means for mounting said inertia element for rotative movement on said rotatable member in concentric relation thereto and including cushioning means for absorbing the road shock on the vehicle wheels transmitted to the inertia element, resilient yielding means providing a driving connection between said rotatable member and inertia element and adapted to permit rotative movement of the inertia element relative to the rotatable member upon changes in the speed of rotation of the rotatable member, and means actuated in response to the relative rotative movement between the inertia element and the rotatable member.

3. A rotary inertia device for registering the rotative condition of a vehicle wheel, comprising a member rotatable with the vehicle wheel, an annular rotary inertia element arranged in concentric surrounding relation to the said rotatable member, means including cushioning means interposed between the rotatable member and inertia element for rotatably supporting the inertia element on the rotatable member, resilient yielding means providing a driving connection between said rotatable member and inertia element and adapted to permit rotative movement of the inertia element relative to the rotatable member upon changes in the speed of rotation of the rotatable member, and means actuated in response to the relative rotative movement between the inertia element and the rotatable member.

4. A rotary inertia device for registering the rotative condition of a vehicle wheel, comprising a member rotatable with the vehicle wheel, an annular rotary inertia element concentrically disposed with respect to the said rotatable member, and means including an annular cushioning ring interposed between the rotatable member and inertia element for mounting said inertia element for rotation on the rotatable member, resilient yielding means providing a driving connection between said rotatable member and inertia element and adapted to permit rotative movement of the inertia element relative to the said rotatable member upon changes in the speed of rotation of the rotatable member, and means actuated in response to the relative rotative movement between the inertia element and the rotatable member.

5. A rotary inertia device for registering the rotative condition of a vehicle wheel, comprising a member rotatable with the vehicle wheel, an annular rotary inertia element arranged in concentric relation to said rotatable member, means for mounting the inertia element rotatably on said rotatable member and including a plurality of resiliently mounted rollers carried by the rotatable member, resilient yielding means providing a driving connection between the rotatable member and inertia element and adapted to permit rotative movement of the inertia element relative to the rotatable member upon changes in speed of rotation of the rotatable member, and means actuated in response to the relative rotative movement between the inertia element and the rotatable member.

6. A rotary inertia device for registering the rotative condition of a vehicle wheel, comprising a member rotatable with the vehicle wheel, a one-piece annular inertia element assembled endwise over the rotatable member and arranged in close concentric surrounding relation to the rotatable member, said rotatable member and inertia element having complementary peripheral grooves on the outer and inner surfaces thereof respectively, ball bearing elements adapted to be received in the complementary grooves in interposed relation between the inertia element and the rotatable member for rotatably mounting the inertia element on the rotatable member and locking the inertia element to the rotatable member for rotation in a fixed plane, said inertia element having a transverse passage through which the ball bearing elements are introduced into the complementary grooves while the inertia element is disposed in close concentric surrounding relation to the rotatable member, and a plurality of separate elements secured to the inertia element and adapted to extend into the space between the inertia element and the rotatable member for holding the said ball bearing elements in fixed spaced angular position with respect to the inertia element, resilient yielding means providing a driving connection between the rotatable member and inertia element and adapted to permit rotative movement of the inertia element relative to the rotatable member upon changes in the speed of rotation of the rotatable member, and means actuated in response to the relative rotative movement between the inertia element and the rotatable member.

7. A rotary inertia device comprising a rotatable element, a rotary inertia element, a radially disposed leaf spring providing a resilient yielding connection through which said inertia element is driven by the said rotatable member, and means operatively responsive to relative rotary movement between the said member and inertia element.

8. A rotary inertia device comprising a rotary member adapted to be rotated at different speeds, an annular inertia element disposed in concentric surrounding relation with respect to and rotatively mounted on the said rotary member, a radially disposed leaf spring providing a resilient yielding driving connection between the rotary member and the said inertia element and adapted to permit rotative movement of the inertia element with respect to the rotary member in opposite directions from a given normal position, and switch means operated in response to the relative rotary movement between the said rotary member and its element.

9. A rotary inertia device comprising a rotatable member, a rotary inertia element, a spring providing a resilient driving connection between the said member and inertia element and adapted to permit said inertia element to shift rotatively with respect to the said rotary member upon acceleration and deceleration of the said rotatable member, and switch means including said spring adapted to control an electrical circuit in response to the relative rotative movement between the said rotary member and inertia element.

10. A rotary inertia device comprising a rotatable member, a rotary inertia element arranged in coaxial relation to the rotatable member, a leaf spring providing a resilient yielding driving connection between said member and inertia element and adapted to permit the inertia element to shift rotatively relative to the said member upon acceleration and deceleration of said rotatable member, and switch means including said spring and an element carried by the rotatable member, said spring and switch element cooperating to control an electrical circuit in response to the relative rotative movement between the said rotary member and the inertia element.

11. A rotary inertia device comprising a rotatable member, a rotary inertia element, a leaf spring yieldingly connecting said member and inertia element and through which the said rotatable member drives the said inertia element, said leaf spring being flexed in opposite directions from a normal position when the inertia element tends to over-run or under-run the said rotatable member upon the deceleration and acceleration respectively of the rotatable member, a switch member carried by the rotatable member and so disposed with respect to said leaf spring as to be normally disengaged from said spring and adapted to be engaged by said spring upon a predetermined amount of flexing of said spring out of its normal position, and means providing a continuous electrical connection to said leaf spring and said switch member from a stationary point whereby said leaf spring and switch member cooperate to control an electrical circuit.

12. A rotary inertia device comprising a rotatable member, a rotary inertia element, a leaf spring yieldingly connecting said member and inertia element and through which the said member drives the inertia element, said leaf spring having a normal substantially unflexed condition when the rotatable member rotates at a uniform speed and being adapted to flex in opposite directions out of its normal condition in response to the tendency of the inertia element to over-run or under-run the rotatable member upon deceleration and acceleration respectively of the rotatable member, a pair of switch members carried by the rotatable member and located respectively on opposite sides of the leaf spring, said switch members being normally out of contact with said leaf spring and adapted to be engaged by the leaf spring when the leaf spring is flexed in the corresponding direction out of its normal position, and means providing a continuous electrical connection to said switch members and leaf spring from a stationary point whereby the engagement and disengagement of the leaf spring with said switch members controls corresponding electrical circuits.

13. A rotary inertia device comprising a rotatable member, a rotary inertia element, a leaf spring providing a resilient yielding connection between the said member and inertia element and adapted to permit relative rotative movement of the inertia element and the said member upon acceleration and deceleration of the said rotatable member, said leaf spring having a normal substantially unflexed position when the rotatable member rotates at a uniform speed and being adapted to flex in an opposite direction out of its normal position in response to relative rotative movement between the inertia element and said member, a pair of electrically connected switch members carried by the rotatable member and located respectively on opposite sides of the leaf spring, said switch members being normally out of contact with said leaf spring and adapted to be engaged by the leaf spring when it is flexed in a corresponding direction out of its normal position, and means providing a continuous electrical connection to said switch members and leaf spring from a stationary point whereby the engagement and disengagement of the leaf spring with either of said switch members controls the same electrical circuit.

14. A rotary inertia device comprising a rotatable member, a rotary inertia element, a leaf spring providing a resilient yielding connection through which the inertia element is driven by the rotatable member, said leaf spring having a normal substantially unflexed position when the rotatable member rotates at a uniform speed and being adapted to flex in opposite directions from its normal position in response to the tendency of the inertia element to over-run or under-run the rotatable member when the rotatable member is decelerated and accelerated respectively, two groups of switch members, one group being located on one side of the leaf spring and the other group being located on the opposite side of the leaf spring, the switch members of each group being normally out of engagement with the leaf spring in the unflexed position of the spring and so arranged as to be successively engaged by the leaf spring as the spring flexes an increasing degree out of its normal position, and means providing a continuous electrical connection to said leaf spring and said switch members from a stationary point whereby the cooperation of the spring with the switch members controls a plurality of electrical circuits.

15. A rotary inertia device comprising a rotatable member, an annular inertia element disposed in concentric surrounding relation to the rotatable member, a lever pivotally mounted on the inertia element, resilient yielding means interposed between said lever and the said inertia element for biasing said lever to a certain normal position, means fixed on the rotatable member and cooperating mechanically with said lever in a manner such that the said resilient means normally positions the inertia element in a predetermined normal position with respect to the rotatable member and adapted to cause pivotal movement of said lever in a direction opposed by the yielding resisting force of said resilient means whenever the inertia element tends to over-run or under-run the rotatable member in response to a change of speed of the rotatable member, and control means including cooperating elements on the rotatable member and the inertia element.

16. In a wheel and axle assembly of the type including a non-rotative axle, a wheel rotatably mounted thereon, and a tubular member secured to said wheel and rotatable therewith in concentric coaxial relation with respect to the non-rotatable axle, the combination of an annular inertia element disposed in concentric relation to the said tubular element and rotatively mounted thereon, a leaf spring providing a resilient driving connection between the tubular member and the inertia element, said leaf spring having a normally substantially unflexed position when the tubular member and inertia element rotate at substantially the same speed and being adapted to flex in opposite directions to varying degrees out of its normal unflexed position according to the rate of acceleration and deceleration of the vehicle wheel, a contact member carried by the tubular member and so disposed as to be normally disengaged from said spring and adapted to be engaged by said spring upon the flexing thereof a predetermined degree out of its normal position, a plurality of slip rings carried by the tubular member and rotatable therewith in concentric surrounding relation to the said nonrotative axle, said spring and contact member being respectively connected to different ones of said slip rings, and a brush device having a plurality of brushes for respectively engaging corresponding ones of said slip rings, and means for supporting said brush device in a fixed position on the non-rotative axle.

17. In a wheel and axle assembly of the type including a pair of vehicle wheels fixed at opposite ends of a connecting axle, and a brake device associated with said wheel and axle assembly, said brake device having a nonrotative annular casing concentrically surrounding the said axle, the combination of an annular inertia element disposed in concentric relation to said axle and rotatively mounted thereon in a manner to be concentrically surrounded by the annular casing of the brake device, resilient means forming a driving connection between the said axle and the annular inertia element adapted to permit the inertia element to shift rotatively relative to said axle in opposite directions from a normal position in response to acceleration and deceleration respectively of said axle, and control means operated in response to the relative rotative movement between the inertia element and the said axle.

18. In a wheel and axle assembly of the type including a pair of vehicle wheels fixed at opposite ends of a connecting axle and a brake device associated with said wheel and axle assembly, said brake device having a nonrotative annular casing concentrically surrounding the said axle, the combination of an annular inertia element disposed in concentric relation to the said axle and rotatively mounted thereon in a manner to be concentrically surrounded by the annular casing of the brake device, resilient means forming a driving connection between the said axle and the annular inertia element adapted to permit the inertia element to shift rotatively relative to the said axle in opposite directions from a normal position in response to acceleration and deceleration respectively of the said axle, switch means having cooperating elements adapted to be operated in response to the relative rotative movement between the inertia element and the said axle, a plurality of slip rings carried by and rotatable in concentric relation with the said axle adapted to be electrically connected to said switch elements, and a brush device non-rotatively mounted on the vehicle for cooperating with said slip rings.

JOSEPH C. McCUNE.